3,632,805
PROCESS FOR PRODUCING 1-AMINOALKYL-
BENZODIAZEPINE DERIVATIVES
Hisao Yamamoto, Nishinomiya-shi, Shigeho Inaba, Takarazuka-shi, Toshiyuki Hirohashi, Kobe, Kikuo Ishizumi and Isamu Maruyama, Minoo-shi, and Kazuo Mori, Kobe, Japan, assignors to Sumitomo Chemical Company, Ltd., Higashi-ku, Osaka, Japan
No Drawing. Filed Nov. 29, 1968, Ser. No. 780,174
Claims priority, application Japan, Dec. 8, 1967, 42/78,903, 42/78,904; Dec. 9, 1967, 42/79,169; Dec. 21, 1967, 42/82,274
Int. Cl. C07d 53/06
U.S. Cl. 260—239.3   16 Claims

ABSTRACT OF THE DISCLOSURE

1 - aminoalkyl - benzodiazepine - 2 - ones are produced with commercial advantages through ring expansion by oxidation of N-aminoalkyl-2-aminomethyl-indoles. The starting N-aminoalkyl-2-aminomethyl-indoles are prepared either by subjecting an indole-2-carboxamide to aminoalkylation and to dehydration in an optional order and then reducing the resulting N-aminoalkyl-indole-2-carbonitrile, or by directly reducing an N - aminoalkyl - 2 - carboxamide.

---

This invention relates to a novel process for producing 1-substituted benzodiazepine derivatives. More particularly, the invention pertains to a novel process for preparing 1-substituted benzodiazepine derivatives, and salts thereof, represented by the general formula

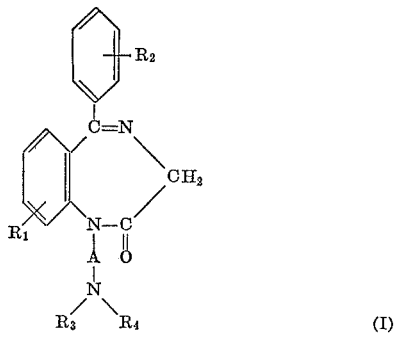

(I)

wherein A signifies a straight chain or branched-chain lower alkylene group having 1–5 carbon atoms; $R_1$ signifies a hydrogen atom, a halogen atom, a nitro group, a lower alkyl group, a lower alkoxy group, or a halogenated alkyl group; $R_2$ signifies a hydrogen atom, a halogen atom, a nitro group, a lower alkyl group, a lower alkoxy group or a halogenated alkyl group; $R_3$ signifies a hydrogen atom or a lower alkyl group; and $R_4$ signifies a lower alkyl group; provided that $R_3$ and $R_4$ may form an optionally substituted 5- or 6-membered heterocyclic ring together with the adjacent nitrogen atom, and said heterocyclic ring may further contain a hetero atom.

In the compound represented by the aforesaid general Formula I, the halogen atom includes chlorine, bromine, iodine and fluorine atoms; the alkyl group includes straight chain or branched-chain alkyl groups; the lower alkyl group includes, for example, methyl, ethyl, n-propyl, isopropyl, n-butyl and tertiary butyl groups; the lower alkoxy group includes, for example, methoxy, ethoxy, n-propoxy, isopropoxy, n-butoxy and tertiary butoxy groups; and the halogenated alkyl group is preferably a trifluoromethyl group, for example. A represents a straight chain or branched-chain alkylene group having 1–5 carbon atoms, and includes, for example, methylene, ethylene, 1-methylethylene, 2-methylethylene, trimethylene, 1-methyltrimethylene, 2-methyltrimethylene and 2-ethyltrimethylene groups. In case $R_4$ and $R_5$ form a heterocyclic ring together with the nitrogen atom, the heterocyclic group is, for example, a pyrrolidino, piperidino or morpholino group, or a substituted derivative thereof. Preferable as the substituent is an alkyl group, e.g. a methyl or ethyl group; a hydroxyalkyl group, e.g. a hydroxyethyl group; an alkoxyalkyl group, e.g. an ethoxyethyl group; or an alkenyloxyalkyl group, e.g. a vinyloxyethyl group. Advantageous heterocyclic groups are, for example, pyrrolidino, piperidino, piperazino, alkyl-bipiperazino, alkyloxyalkyl-piperazino, alkyloxyalkylpiperazino and morpholino groups.

The present invention is concerned with a process for producing 1-substituted benzodiazepine derivatives, and salts thereof, represented by the aforesaid general Formula I by treating with a suitable oxidizing agent a 1-substituted 2-aminomethyl-indole derivative, or a salt thereof, represented by the general formula

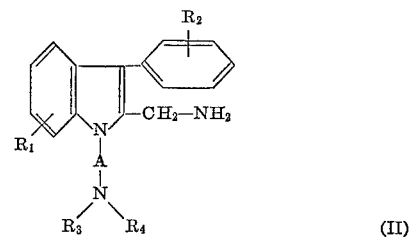

(II)

wherein A, $R_1$, $R_2$, $R_3$ and $R_4$ are as defined above in Formula I.

The 1-substituted benzodiazepine derivatives represented by the Formula I have prominent effects as tranquilizers, muscle relaxants, antispasmodics and hypnotics, and are of great important as medicines.

A few processes for producing these benzodiazepine derivatives have heretofore been described. For instance, it is known to obtain the 1-substituted benzodiazepine derivatives by synthesizing 1-unsubstituted-1,3-dihydro-2H-1,4-benzodiazepine-2-one and then alkylating the compound with sodium methoxide and various aminoalkyl halides, or by reacting 1-unsubstituted-1,3-dihydro-2H-1,4-benzodiazepine-2-one with a haloalkyl halide such as 1-bromo-3-chloropropane to effect haloalkylation and then reacting the resulting 1-haloalkylated compound with an amine. [L. H. Sternbach et al., J. Med. Chem., p. 815 (1965).]

Contrary to these procedures, we have found, unexpectedly, that benzodiazepine derivatives of the Formula I can be smoothly and economically prepared in high yields and of high purity by reacting a 2-aminomethyl-indole derivative having the Formula II, or a salt-thereof, with an appropriate oxidizing agent. Such a process for converting a 5-membered ring compound into a 7-membered ring compound by ring expansion reaction has not heretofore been described or suggested in the literature. This new and useful process thus differs markedly from the known methods and represents an improvement thereover.

The 2-aminomethyl-indole derivatives of the Formula II which are employed in the present invention are novel compounds. They are easily prepared by reducing indole-2-carbonitrile derivatives having the formula

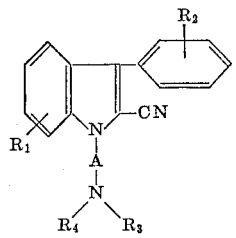

(III)

wherein A, $R_1$, $R_2$, $R_3$ and $R_4$ are as defined above or indole-2-carboxyamide derivatives having the formula

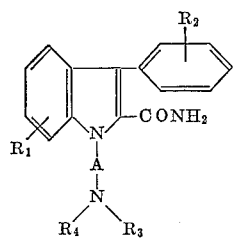

(IV)

wherein A, $R_1$, $R_2$, $R_3$ and $R_4$ are as defined above. Both the derivatives of the Formula III and those of the Formula IV are novel compounds.

The novel indole-2-carbonitrile derivatives of the Formula III are obtained with ease and in high yields either by subjecting the carboxamide derivatives of the Formula IV to dehydration reaction, or by condensing N-unsubstituted indole-2-carbonitrile derivatives of the formula

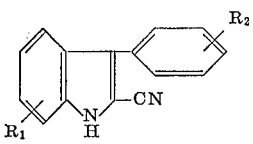

(V)

wherein $R_1$ and $R_2$ have the same significances as mentioned before, with reactive esters of amino-alcohols represented by the formula

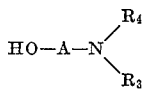

(VI)

wherein A, $R_3$ and $R_4$ are as defined above.

The compounds of the Formula IV mentioned above are also novel, and are prepared by reacting corresponding N-unsubstituted indole-2-carboxamides of the formula

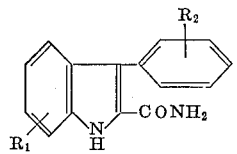

(VII)

wherein $R_1$ and $R_2$ have the same significances as mentioned before, with the above-mentioned reactive esters of aminoalcohols having the Formula VI. Further, the compounds of the Formula V are also novel, and may be obtained by subjecting the indole-2-carboxamide derivatives of the Formula VII to dehydration reaction.

In accordance with the present invention, the method for producing the benzodiazepine derivatives of the Formula I may be represented, in general, by the following reaction schema:

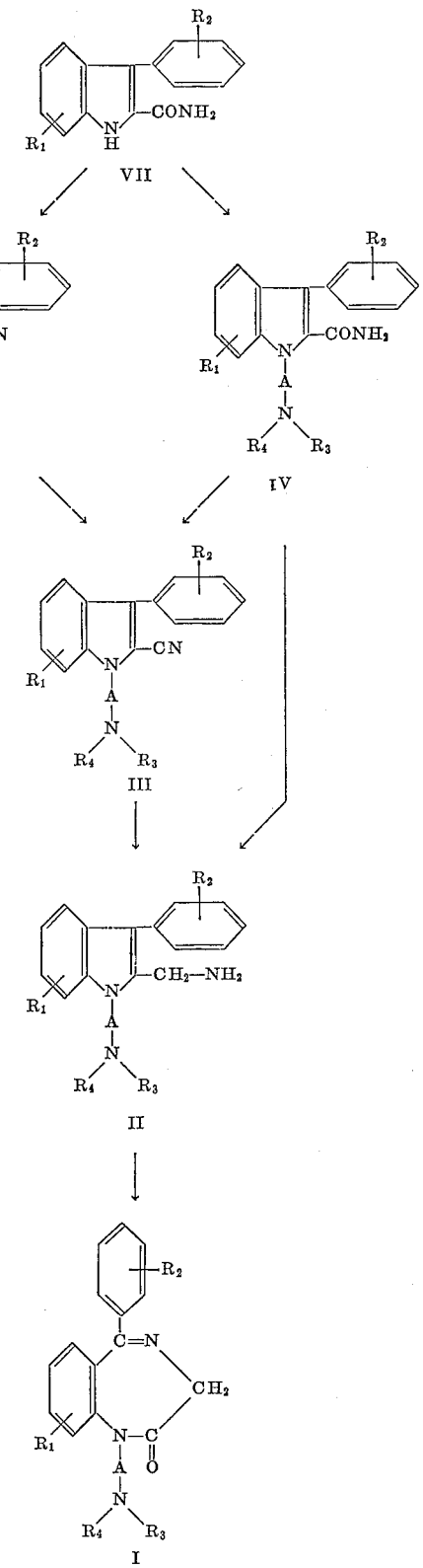

The indole-2-carboxamide derivatives of the Formula VII, which are initial starting compounds in the present process, are prepared by reacting, according to an ordinary procedure, corresponding carboxylic acids or their reactive derivatives with ammonia to form amides. The carboxylic acids can be prepared by cyclizing, phenylhydrazone derivatives of the formula

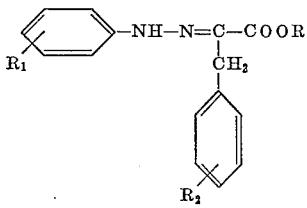

wherein $R_1$ and $R_2$ are as defined above; R represents an alkyl group having 1–4 carbon atoms or benzyl group, which are obtained, for example, either by reacting corresponding phenylpyruvic acid compounds with phenylhydrazine compounds or salts thereof, or by reacting β-keto-acid ester derivatives of the formula

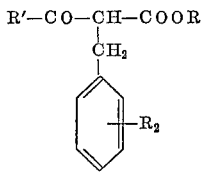

wherein R' represents an alkyl group having 1–4 carbon atoms; and $R_2$ is as defined above, with benzenediazonium salts of the formula

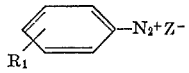

wherein Z represents a halogen atom, and $R_1$ is as defined above.

The preparation of the indole-2-carboxamides of the Formula VII is described in detail in our copending United States application Ser. No. 725,195 filed Apr. 29, 1968.

All of these processes proceed smoothly and give the objective products in high yields, and therefore these procedures are quite advantageous, in practice.

An object of the present invention is to provide a novel process for preparing benzodiazepine derivatives by treating the 1-substituted 2-aminomethylindole derivatives of the Formula II with a suitable oxidizing agent.

Another object is to provide a novel process for preparing salts of benzodiazepine derivatives by treating the benzodiazepine derivatives of the Formula I with a mineral acid such as hydrochloric, sulfuric, nitric or phosphoric acid, or with an organic acid such as maleic, fumaric, succinic, formic or acetic acid.

A further object is to provide a process for preparing novel indole derivatives.

Other objects of the invention will become apparent from the description that follows.

In order to achieve the above objects, the present invention provides a process for preparing benzodiazepine derivatives represented by the Formula I which comprises reacting a 2-aminomethylindole derivative represented by the Formula II, or a salt thereof, with an oxidizing agent.

Further, the present invention provides a process for producing salts of benzodiazepine derivatives of the Formula I which comprises reacting a 2-aminomethylindole derivative of the Formula II, or a salt thereof, with an oxidizing agent to yield a benzodiazepine derivative of the Formula I, and then reacting said benzodiazepine derivative with a mineral acid such as hydrochloric, sulfuric, nitric or phosphoric acid, or with an organic acid such as maleic, fumaric, succinic, formic, or acetic.

The process of the present invention are carried out through a ring expansion reaction from indole rings to benzodiazepine rings. Such reaction is novel and has not heretofore been described in the literature.

In preparing the benzodiazepine derivatives according to this invention, 2-aminomethylindole derivatives represented by the Formula II, or salts thereof, are reacted with an appropriate oxidizing agent. The oxidizing agent for this process includes, for example, ozone, hydrogen peroxide, peracids (e.g. performic, peracetic and perbenzoic acids), chromic acid, potassium permanganate, and manganese dioxide, but is not limited to the named compounds. Generally, the reaction progresses readily at room temperature, but the temperature may be higher or lower as necessary to effect the desired control of the reaction. The oxidizing agent is preferably chromic acid or ozone. The reaction is preferably effected in the presence of a solvent. The choice of solvent depends on the oxidizing agent employed, and is selected from the group consisting of water, acetone, carbon tetrachloride, acetic acid, sulfuric acid and the like. The oxidizing agent is used in the stoichiometric amount or more. The reaction temperature varies depending on the oxidizing agent employed.

Where the oxidation is carried out by use of chromic acid in the presence of acetic acid, it is preferable that the chromic acid may be used in 2–3 times the equimolar amount and that the reaction may be carried out at room temperature. A 2-aminomethylindole derivative is dissolved or suspended in the solvent and the oxidizing agent is added to the solution or suspension with stirring. Generally, the reaction terminates within about 24 hours.

Where the oxidation is carried out by use of ozone, the reaction is preferably carried out at room temperature. A 2-aminomethylindole derivative is dissolved or suspended in the solvent such as formic acid, acetic acid, carbontetrachloride or the like and ozonized oxygen is bubbled into the solution or suspension with stirring.

The desired benzodiazepine derivative can be separated from the reaction mixture in a crude form by extraction, with or without prior neutralization, and by evaporation to dryness. The product is further purified, if desired, by recrystallization from a suitable solvent such as ethanol, isopropanol or the like in a standard manner.

The 1-substituted-benzodiazepine derivative obtained according to the above-mentioned process may also be isolated in the form of an acid addition salt by treatment with an acid, e.g., a mineral acid such as hydrochloric, sulfuric, nitric, phosphoric or chromic acid, or an organic acid such as maleic, fumaric, succinic, formic or acetic acid.

According to the process of the present invention, there are produced such benzodiazepine derivatives and acid addition salts thereof as shown below.

1-(2'-dimethylaminoethyl)-5-phenyl-1,3-dihydro-2H-1,4-benzodiazepine-2-one
1-(2'-dimethylaminoethyl)-5-phenyl-7-chloro-1,3-dihydro-2H-1,4-benzodiazepine-2-one
1-(2'-dimethylaminoethyl)-5-phenyl-7-bromo-1,3-dihydro-2H-1,4-benzodiazepine-2-one
1-(2'-dimethylaminoethyl)-5-phenyl-7-fluoro-1,3-dihydro-2H-1,4-benzodiazepine-2-one
1-(2'-dimethylaminoethyl)-5-phenyl-9-chloro-1,3-dihydro-2H-1,4-benzodiazepine-2-one
1-(2'-dimethylaminoethyl)-5-phenyl-7-nitro-1,3-dihydro-2H-1,4-benzodiazepine-2-one
1-(2'-dimethylaminoethyl)-5-phenyl-7-trifluoromethyl-1,3-dihydro-2H-1,4-benzodiazepine-2-one
1-(2'-dimethylaminoethyl)-5-(o-fluorophenyl)-7-chloro-1,3-dihydro-2H-1,4-benzodiazepine-2-one
1-(2'-dimethylaminoethyl)-5-(o-fluorophenyl)-1,3-dihydro-2H-1,4-benzodiazepine-2-one
1-(2'-dimethylaminoethyl)-5-(o-chlorophenyl)-7-chloro-1,3-dihydro-2H-1,4-benzodiazepine-2-one
1-(2'-dimethylaminoethyl)-5-(m-nitrophenyl)-7-chloro-1,3-dihydro-2H-1,4-benzodiazepine-2-one
1-(2'-dimethylaminoethyl)-5-(p-chlorophenyl)-7-chloro-1,3-dihydro-2H-1,4-benzodiazepine-2-one
1-(2'-dimethylaminoethyl)-5-(p-bromophenyl)-7-chloro-1,3-dihydro-2H-1,4-benzodiazepine-2-one
1-(2'-diethylaminoethyl)-5-phenyl-7-chloro-1,3-dihydro-2H-1,4-benzodiazepine-2-one
1-(2'-diethylaminoethyl)-5-phenyl-7-bromo-1,3-dihydro-2H-1,4-benzodiazepine-2-one 1-(2′-diethylaminoethyl)-5-(o-chlorophenyl)-7-chloro-1,3-dihydro-2H-1,4-benzodiazepine-2-one
1-(2′-diethylaminoethyl)-5-(o-fluorophenyl)-7-chloro-1,3-dihydro-2H-1,4-benzodiazepine-2-one
1-(2′-diethylaminoethyl)-5-(o-fluorophenyl)-7-bromo-1,3-dihydro-2H-1,4-benzodiazepine-2-one
1-(2′-diethylaminoethyl)-5-phenyl-7-methyl-1,3-dihydro-2H-1,4-benzodiazepine-2-one
1-(2′-diethylaminoethyl)-5-phenyl-7-methoxy-1,3-dihydro-2H-1,3-benzodiazepine-2-one
1-(3′-methylaminopropyl)-5-(o-fluorophenyl)-7-chloro-1,3-dihydro-2H-1,4-benzodiazepine-2-one
1-(3′-dimethylaminopropyl)-5-phenyl-7-chloro-1,3-dihydro-2H-1,4-benzodiazepine-2-one
1-(3′-dimethylaminopropyl)-5-phenyl-1,3-dihydro-2H-1,4-benzodiazepine-2-one
1-(3′-dimethylaminopropyl)-5-phenyl-7-nitro-1,3-dihydro-2H-1,4-benzodiazepine-2-one
1-(3′-diethylaminopropyl)-5-(o-fluorophenyl)-7-chloro-1,3-dihydro-2H-1,4-benzodiazepine-2-one
1-(2′-dimethylamino-1′-methylethyl)-5-phenyl-7-chloro-1,3-2H-1,4-benzodiazepine-2-one
1-(2′-pyrrolidinoethyl)-5-phenyl-7-chloro-1,3-dihydro-2H-1,4-benzodiazepine-2-one
1-(2′-piperidinoethyl)-5-phenyl-7-chloro-1,3-dihydro-2H-1,4-benzodiazepine-2-one
1-(2′-morpholinoethyl)-5-phenyl-7-chloro-1,3-dihydro-2H-1,4-benzodiazepine-2-one
1-(2′-diethylaminoethyl)-5-(o-nitrophenyl)-7-chloro-1,3-dihydro-2H-1,4-benzodiazepine-2-one
1-(2′-diethylaminoethyl)-5-(p-tolyl)-7-chloro-1,3-dihydro-2H-1,4-benzodiazepine-2-one
1-(2′-piperidinoethyl)-5-phenyl-7-chloro-1,3-dihydro-2H-1,4-benzodiazepine-2-one
1-[2′-(4″-methyl-1″-piperazinyl)ethyl]-5-phenyl-7-chloro-1,3-dihydro-2H-1,4-benzodiazepine-2-one
1-[2′-(4″-methyl-1″-piperazinyl)ethyl]-5-(o-fluorophenyl)-7-chloro-1,3-dihydro-2H-1,4-benzodiazepine-2-one
1-(3′-piperazinopropyl)-5-(o-fluorophenyl)-7-chloro-1,3-dihydro-2H-1,4-benzodiazepine-2-one
1-[3′(4″-methyl-1″-piperazinyl)propyl]-5-phenyl-7-chloro-1,3-dihydro-2H-1,4-benzodiazepine-2-one
1-[3′-(4″-methyl-1″-piperazinyl)propyl]-5-(o-fluorophenyl)-7-chloro-1,3-dihydro-2H-1,4-benzodiazepine-2-one
1-[3′(4″-[2″-ethoxyethyl]-1″-piperazinyl)propyl]-5-(o-fluorophenyl)-7-chloro-1,3-dihydro-2H-1,4-benzodiazepine-2-one.

In the next place, the process for preparing the 2-aminomethylindole compounds of the Formula II is explained below.

The process for preparing the above compounds is divided into 2 procedures, using as starting materials the indole-2-carboxamide derivatives of the Formula VII, as shown in the aforesaid reaction schema.

One procedure comprises the steps of subjecting the indole-2-carboxamide derivatives to dehydration reaction to form indole-2-carbonitrile derivatives of the Formula V, condensing said carbonitrile derivatives with the reactive esters of aminoalcohol of the Formula VI, and then reducing the resulting 1-substituted indole-2-carbonitrile derivatives of the Formula III.

The other procedure comprises the steps of condensing the carboxamide derivatives of the Formula VII with reactive esters of amino-alcohols of the Formula VI, and then directly reducing the resulting 1-substituted indole-2-carboxamide derivatives of the Formula IV, or subjecting said carboxamide derivatives of the Formula IV to dehydration reaction and then reducing the resulting carbonitrile derivatives of the Formula III.

According to the above process, the indole-2-carboxamide derivatives of the Formula VII can be converted in high yields into corresponding carbonitrile derivatives of the Formula V.

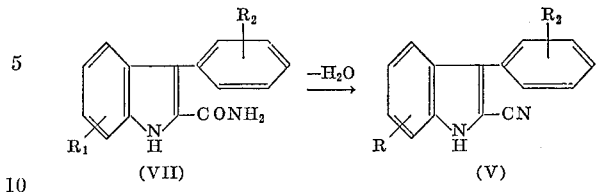

In practicing the above process, the indole-2-carboxamide derivative of the Formula VII is heated in the presence of a dehydrating agent, to form the indole-2-carbonitrile derivative of the Formula V. Useful as the dehydrating agent are, for example, phosphorus halides such as phosphorus oxychloride, phosphorus trichloride and phosphorus pentachloride, or acid chlorides, such as p-toluenesulfonyl chloride, methylsulfonyl chloride, acetyl chloride, thionyl chloride, benzoyl chloride and carbobenzoxy chloride. These are used in the presence or absence of an inert solvent.

According to the above process, the following indole-2-carbonitrile derivatives are produced:

3-phenylindole-2-carbonitrile
3-phenyl-5-chloroindole-2-carbonitrile
3-phenyl-5-nitroindole-2-carbonitrile
3-phenyl-5-trifluoromethylindole-2-carbonitrile
3-phenyl-7-chloroindole-2-carbonitrile
(o-nitrophenyl)-5-chloroindole-2-carbonitrile
3-(p-tolyl)-5-chloroindole-2-carbonitrile
(m-nitrophenyl)-5-chloroindole-2-carbonitrile
(p-chlorophenyl(-5-chloroindole-2-carbonitrile
3-(p-bromophenyl)-5-chloroindole-2-carbonitrile
3-phenyl-5-chloro-7-methylthioindole-2-carbonitrile
3-phenyl-5-chloroindole-2-carbonitrile
(o-chlorophenyl)-5-chloroindole-2-carbonitrile
(o-fluorophenyl)-5-chloroindole-2-carbonitrile
(o-fluorophenyl)-5-bromoindole-2-carbonitrile
3-phenyl-5-methylindole-2-carbonitrile
3-phenyl-5-methoxyindole-2-carbonitrile.

The thus-obtained indole-2-carbonitriles of the Formula V are condensed with the reactive esters of amino-alcohols of the Formula VI, whereby the 1-substituted indole-2-carbonitrile derivatives of the Formula III can be readily obtained.

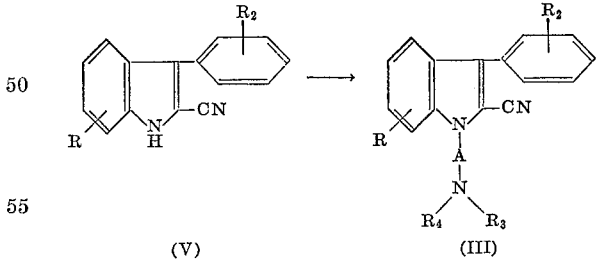

As the reactive esters of amino-alcohols of the Formula VI, there are used halides and sulfonate esters. The halides include chlorides, bromides and iodides, and the sulfonate esters include, for example, methylsulfonate, p-toluenesulfonate and β-naphthalenesulfonate esters.

The above-mentioned process is effected in such a manner that the indole-2-carbonitrile derivatives of the Formula V are treated with suitable condensing agents to form metal salts which are treated with the reactive esters of amino-alcohols represented by the Formula VI to form the 1-substituted indole-2-carbonitrile derivatives of the Formula III.

The suitable condensing agents include, for example, alkali metals, alkaline earth metals, alkali metal hydrides, alkaline earth metal hydrides, alkali metal hydroxides, alkaline earth metal hydroxides, alkali metal amides, alkaline earth metal amides, alkali metal alkoxides, alkaline earth metal alkoxides, alkylalkali metals and arylalkali metals. Particularly preferable are sodium, potassium, lithium, sodium hydride, lithium hydride, sodium amide, potassium amide. lithium amide, butyllithium, phenylsodium and phenyllithium. The reaction may be carried out in such suitable solvent as benzene, toluene, xylene, dimethylformamide, dioxane, liquid ammonia and the like.

In accordance with the above process, there are obtained, for example, the following 1-substituted indole-2-carbonitrile derivatives.

1-(2'-dimethylaminoethyl)-3-phenylindole-2-carbonitrile
1-(2'-dimethylaminoethyl)-3-phenyl-5-chloroindole-2-carbonitrile
1-(2'-dimethylaminoethyl)-3-phenyl-5-nitroindole-2-carbonitrile
1-(2'-dimethylaminoethyl)-3-phenyl-5-trifluoromethylindole-2-carbonitrile
1-(2'-dimethylaminoethyl)-3-phenyl-7-chloroindole-2-carbonitrile
1-(2'-dimethylaminoethyl)-3-(o-fluorophenyl)-5-chloroindole-2-carbonitrile
1-(2'-dimethylaminoethyl)-3-(3'-nitrophenyl)-5-chloroindole-2-carbonitrile
1-(2'-dimethylaminoethyl)-3-(p-chlorophenyl)-5-chloroindole-2-carbonitrile
1-(2'-dimethylaminoethyl)-3-(p-bromophenyl)-5-chloroindole-2-carbonitrile
1-(2'-diethylaminoethyl)-3-phenyl-5-chloroindole-2-carbonitrile
1-(2'-diethylaminoethyl)-3-(o-chlorophenyl)-5-chloroindole-2-carbonitrile
1-(2'-diethylaminoethyl)-3-(o-fluorophenyl)-5-chloroindole-2-carbonitrile
1-(2'-diethylaminoethyl)-3-(o-fluorophenyl)-5-bromoindole-2-carbonitrile
1-(2'-diethylaminoethyl)-3-phenyl-5-methylindole-2-carbonitrile
1-(3'-methylaminopropyl)-3-(o-fluorophenyl)-5-chloroindole-2-carbonitrile
1-(2'-diethylaminoethyl)-3-phenyl-5-methoxyindole-2-carbonitrile
1-(3'-dimethylaminopropyl)-3-phenyl-5-chloroindole-2-carbonitrile
1-(3'-dimethylaminopropyl)-3-phenyl-5-nitroindole-2-carbonitrile
1-(3'-dimethylaminopropyl)-3-(o-fluorophenyl)-5-chloroindole-2-carbonitrile
1-(3'-diethylaminopropyl)-3-(o-fluorophenyl)-5-chloroindole-2-carbonitrile
1-(2'-dimethylamino-1'-methylethyl)-3-phenyl-5-chloroindole-2-carbonitrile
1-(2'-pyrrolidinoethyl)-3-phenyl-5-chloroindole-2-carbonitrile
1-(2'-piperidinoethyl)-3-phenyl-5-chloroindole-2-carbonitrile
1-(2'-morpholinoethyl)-3-phenyl-5-chloroindole-2-carbonitrile
1-(2'-diethylaminoethyl)-3-(o-nitrophenyl)-5-chloroindole-2-carbonitrile
1-(2'-diethylaminoethyl)-3-(p-tolyl)-5-chloroindole-2-carbonitrile
1-(2'-piperidinoethyl)-3-phenyl-5-chloroindole-2-carbonitrile
1-[2'-(4''-methyl-1''-piperazinyl)ethyl]-3-(o-fluorophenyl)-5-chloroindole-2-carbonitrile
1-[2'-(4''-methyl-1''-piperazinyl)ethyl]-3-phenyl-5-chloroindole-2-carbonitrile
1-(3'-piperadinopropyl)-3-(o-fluorophenyl)-5-chloroindole-2-carbonitrile
1-[3'-(4''-methyl-1''-piperazinyl)propyl]-3-phenyl-5-chloroindole-2-carbonitrile
1-[3' - (4''-methyl-1''-piperazinyl)propyl] 3 - (o-fluorophenyl)-5-chloroindole-2-carbonitrile
1-[3' - (4''-[2-ethoxyethyl]-1''-piperazinyl) - propyl]-(o-fluorophenyl)-5-chloroindole-2-carbonitrile.

The above-mentioned novel compounds of the Formula III form salts with such mineral acids and organic acids as, for example, hydrochloric, hydrobromic, sulfuric, phosphoric, methanesulfonic, ethanedisulfonic, β-hydroxyethanesulfonic, acetic, lactic, oxalic, succinic, fumaric, maleic, malic, tartaric, citric, benzoic, salicylic, phenylacetic, mandelic and picric acids.

The N-substituted indole - 2 - carbonitrile derivatives of the Formula III can also be prepared by condensing the indole - 2 - carboxamide derivatives of the Formula VII with the reactive esters of amino-alcohols of the Formula VI, and then dehydrating the products, i.e. 1-substituted indole-2-carboxamide derivatives of the Formula IV.

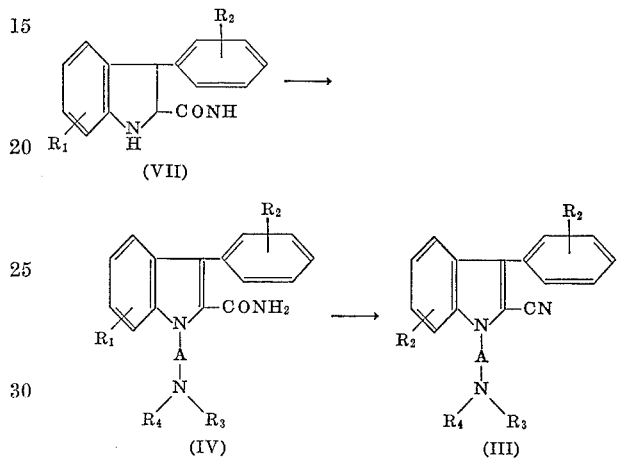

In the condensation reaction of the first stage in the above-described reaction schema, the carboxamides of the Formula IV and salts thereof can be obtained in high yields by adoption of entirely the same conditions and procedures as in the aforesaid case where the 1-substituted indole-2-carbonitrile derivatives of the Formula III are produced from the indole-2-carbonitrile derivatives of the Formula V.

Further, the dehydration reaction of the second stage also progresses easily and in high yields by adoption of the same conditions and procedures as in the aforesaid case where the carbonitriles of the Formula V are produced from the indole-2-carboxamides of the Formula VII.

According to the above process, there are easily obtained, for example, the following 1-substituted indole derivatives:

1-(2'-dimethylaminoethyl)-3-phenylindole-2-carboxamide
1-(2'-dimethylaminoethyl)-3-phenyl-5-chloroindole-2-carboxamide
1-(2'-dimethylaminoethyl)-3-phenyl-5-nitroindole-2-carboxamide
1-(2'-dimethylaminoethyl)-3-phenyl-5-trifluoromethylindole-2-carboxamide
1-(2'-dimethylaminoethyl)-3-phenyl-7-chloroindole-2-carboxamide
1-(2'-dimethylaminoethyl)-3-(o-fluorophenyl)-5-chloroindole-2-carboxamide
1-(2'-dimethylaminoethyl)-3-(3'-nitrophenyl)-5-chloroindole-2-carboxamide
1-(2'-dimethylaminoethyl)-3-(p-chlorophenyl)-5-chloroindole-2-carboxamide
1-(2'-dimethylaminoethyl)-3-(p-bromophenyl)-5-chloroindole-2-carboxamide
1-(2'-dimethylaminoethyl)-3-phenyl-5,7-dichloroindole-2-carboxamide
1-(2'-diethylaminoethyl)-3-phenyl-5-chloroindole-2-carboxamide
1-(2'-diethylaminoethyl)-3-(o-chlorophenyl)-5-chloroindole-2-carboxamide
1-(2'-diethylaminoethyl)-3-(o-fluorophenyl)-5-chloroindole-2-carboxamide 1-(2'-diethylaminoethyl)-3-(o-fluorophenyl)-5-bromoindole-2-carboxamide
1-(2'-diethylaminoethyl)-3-phenyl-5-methylindole-2-carboxamide
1-(2'-diethylaminoethyl)-3-phenyl-5-methoxyindole-2-carboxamide
1-(3'-methylaminopropyl)-3-(o-fluorophenyl)-5-chloroindole-2-carboxamide
1-(3'-dimethylaminopropyl)-3-phenyl-5-chloroindole-2-carboxamide
1-(3'-dimethylaminopropyl)-3-phenyl-5-nitroindole-2-carboxamide
1-(3'-dimethylaminopropyl)-3-(o-fluorophenyl)-5-chloroindole-2-carboxamide
1-(3'-diethylaminopropyl)-3-(o-fluorophenyl)-5-chloroindole-2-carboxamide
1-(2'-dimethylamino-1'-methylethyl)-3-phenyl-5-chloroindole-2-carboxamide
1-(2'-pyrrolidinoethyl)-3-phenyl-5-chloroindole-2-carboxamide
1-(2'-piperidinoethyl)-3-phenyl-5-chloroindole-2-carboxamide
1-(2'-morpholinoethyl)-3-phenyl-5-chloroindole-2-carboxamide
1-(2'-diethylaminoethyl)-3-(o-nitrophenyl)-5-chloroindole-2-carboxamide
1-(2'-diethylaminoethyl)-3-(p-tolyl)-5-chloroindole-2-carboxamide
1-(2'-diethylaminoethyl)-2-acetyl-3-phenylindole-2-carboxamide
1-(2'-piperidinoethyl)-3-phenyl-5-chloroindole-2-carboxamide
1-[2'-(4''-methyl-1''-piperazinyl)ethyl]-3-(o-fluorophenyl)-5-chloroindole-2-carboxamide
1-[2'-(4''-methyl-1''-piperazinyl)ethyl]-3-phenyl-5-chloroindole-2-carboxamide
1-(3'-piperadinopropyl)-3-(o-fluorophenyl)-5-chloroindole-2-carboxamide
1-[3'-(4''-methyl-1''-piperazinyl)-propyl]-3-phenyl-5-chloroindole-2-carboxamide
1-[3'-(4''-methyl-1''-piperazinyl)-propyl]-3-(o-fluorophenyl)-5-chloroindole-2-carboxamide
1-(3'-[4''-(2'''-ethoxyethyl)-1''-piperazinyl]-propyl)-3-(o-fluorophenyl)-5-chloroindole-2-carboxamide.

Further, there are obtained indole-2-carbonitriles corresponding to these compounds.

The above-mentioned novel compounds of the Formula IV can also form salts with such mineral and organic acids as, for example, hydrochloric, hydrobromic, sulfruic, methanesulfonic, ethanedisulfonic, β-hydroxethanesulfonic, acetic, lactic, oxalic, succinic, fumaric, maleic, malic, tartaric, citric, benzoic, salicylic, phenylacetic mandelic and picric acids.

When the thus obtained 1-substituted indole-2-carbonitrile derivatives of the Formula III are reduced, the 1-substituted 2-aminomethylindole derivatives represented by the Formula II can be easily produced.

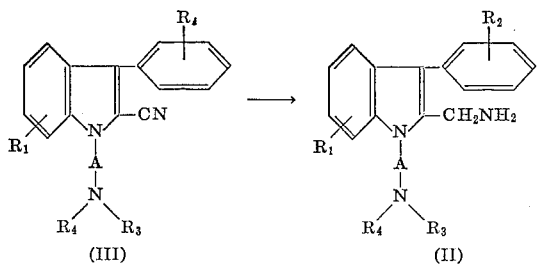

For the production of the compounds represented by the Formula II, the 1-substituted indole-2-carbonitrile derivatives of the Formula III are ordinarily subjected to a known process for the reduction of nitriles to amines. That is, the reduction of said carbonitrile derivatives is carried out according to, for example, electrolytic reduction, reduction with alkali metals in alcohols, catalytic reduction using palladium-, nickel- or platinum-system catalysts, reduction using chromous acetate-alkali, or reduction using metal hydride complexes which include lithium aluminium hydride, boron hydride and their mixture with an acid such as aluminium chloride, ferric chloride, boron trifluoride, hydrogen chloride or the like. Particularly the reduction using lithium aluminium hydride or the mixture of, for example, lithium aluminium hydride and aluminium chloride, sodium borohydride and aluminium chloride, sodium borohydride and boron trifluoride or the like, are preferable in that the operation is simple and the selectivity is favorable.

According to the above process, it is possible to prepare, for example, the following N-substituted 2-aminomethylindole derivatives:

1-(2'-dimethylaminoethyl)-2-aminomethyl-2-phenylindole
1-(2'-dimethylaminoethyl)-2-aminomethyl-3-phenyl-5-chloroindole
1-(2'-dimethylaminoethyl)-2-aminomethyl-3-phenyl-5-nitroindole
1-(2'-dimethylaminoethyl)-2-aminomethyl-3-phenyl-5-trifluoromethylindole
1-(2'-dimethylaminoethyl)-2-aminomethyl-3-phenyl-7-chlorindole
1-(2'-dimethylaminoethyl)-2-aminomethyl-3-(o-fluorophenyl)-5-chloroindole
1-(2'-dimethylaminoethyl)-2-aminomethyl-3-(o-nitrophenyl)-5-nitroindole
1-(2'-dimethylaminoethyl)-2-aminomethyl-3-(p-chlorophenyl)-5-chloroindole
1-(2'-dimethylaminoethyl)-2-aminomethyl-3-(p-bromophenyl)-5-chloroindole
1-(dimethylaminomethyl)-2-aminomethyl-3-phenyl-5-chloroindole
1-(diethylaminomethyl)-2-aminomethyl-3-phenyl-5-chloroindole
1-(2'-diethylaminoethyl)-2-aminomethyl-3-phenyl-5-chloroindole
1-(2'-diethylaminoethyl)-2-aminomethyl-3-(o-chlorophenyl)-5-chloroindole
1-(2'-diethylaminoethyl)-2-aminomethyl-3-(o-fluoro-phenyl)-5-chloroindole
1-(2'-diethylaminoethyl)-2-aminomethyl-3-(o-fluoro-phenyl)-5-bromoindole
1-(2'-diethylaminoethyl)-2-aminomethyl-3-phenyl-5-methylindole
1-(2'-diethylaminoethyl)-2-aminomethyl-3-phenyl-5-methoxyindole
1-(3'-methylaminopropyl)-2-aminomethyl-3-(o-fluoro-phenyl)-5-chloroindole
1-(3'-dimethylaminopropyl)-2-aminomethyl-3-phenyl-5-chloroindole
1-(3'-dimethylaminopropyl)-2-aminomethyl-3-phenyl-5-nitroindole
1-(3'-diethylaminopropyl)-2-aminomethyl-3-phenyl-5-chloroindole
1-(3'-diethylaminopropyl)-2-aminomethyl-3-(o-fluoro-phenyl)-5-chloroindole
1-(2'-dimethylamino-1'-methylethyl)-2-aminomethyl-3-phenyl-5-chloroindole
1-(2'-diethylaminoethyl)-2-aminomethyl-3-(o-nitro-phenyl)-5-chloroindole
1-(2'-diethylaminoethyl)-2-aminomethyl-3-(p-tolyl)-5-chloroindole
1-(2'-pyrrolidinoethyl)-2-aminomethyl-3-phenyl-5-chloroindole
1-(2'-piperidinoethyl)-2-aminomethyl-3-phenyl-5-chloroindole
1-(2'-morpholinoethyl)-2-aminomethyl-3-phenyl-5-chloroindole
1-(2'-piperidinoethyl)-2-aminomethyl-3-phenyl-5-chloroindole 1-[2″(4″-methyl-1″-piperazinyl)ethyl]-3-(o-fluorophenyl)-5-chloroindole 1-[2″-(4″-methyl-1″-piperazinoyl)ethyl]-2-amino-methyl-3-phenyl-5-chloroindole 1-(3′-piperadinopropyl)-2-aminomethyl-3-(o-fluoro-phenyl)-5-chloroindole 1-[3′-(4″-methyl-1″-piperazinoyl)propyl]-2-amino-methyl-3-phenyl-5-chloroindole 1-[3′-(4″-methyl-1″-piperazinoyl)propyl]-2-amino-methyl-3-(o-fluorophenyl)-5-chloroindole The above-mentioned novel compounds of the Formula II can also form salts with such mineral and organic acids as, for example, hydrochloric, hydrobromic, sulfuric, phosphoric, methanesulfonic, ethanesulfonic, β-hydroxy-ethanesulfonic, acetic, lactic, oxalic, succinic, fumaric, maleic, malic, tartaric, citric, benzoic, salicylic, phenyl-acetic, mandelic and picric acids.

Alternatively, the 1-substituted 2-aminomethylindole derivatives of the Formula II may be prepared by reducing the 1-substituted indole-2-carboxamides of the Formula IV.

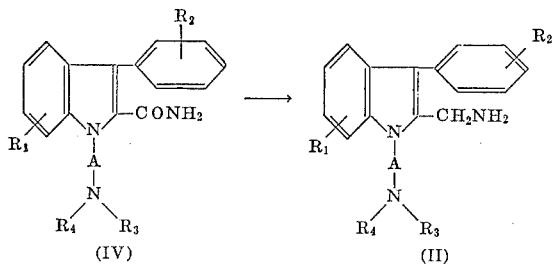

The above reduction may be ordinarily effected by subjecting the compounds represented by the Formula IV to a common process for reducing carboxamide groups to aminomethyl groups. That is, the reduction is carried out according to electrolytic reduction, catalytic reduction, or reduction using metal hydride complexes which include lithium aluminium hydride, boron hydride and their mixture with aluminium chloride, ferric chloride, boron trifluoride, hydrogen chloride or the like. Particularly preferable reducing agents are metal hydride complexes such as, lithium-aluminium hydride and the mixture of, for example, lithium aluminium hydride and aluminium, sodium borohydride and aluminium chloride, sodium borohydride and boron trifluoride and the like, because of their selectivity and easy handling.

Thus, according to the above process also, the 2-aminomethylindole derivatives exemplified above are obtainable from corresponding indole-2-carboxamide derivatives.

The thus obtained 2-aminomethylindole derivatives of the Formula II, or salts thereof, are oxidized according to the procedures described previously, whereby they can be readily converted into the 1-substituted 5-phenyl-benzodiazepine-2-one derivatives of the Formula I which are the desired products of the present process.

This invention is further disclosed in the following examples of preferred embodiments thereof, which are presented for purposes of illustration and are not intended to limit the scope of the invention.

EXAMPLE 1

Step A

To a solution of 15 g. of 5-chloro-3-(o-fluorophenyl)-indole-2-carboxamide in 150 ml. of dimethylformamide and 150 ml. of toluene is added 2.49 g. of 61.4% sodium hydride. The mixture is stirred at room temperature for 1 hour and then at 50° C. for 1 hour. After cooling, 8.55 g. of β-N,N-diethylaminoethylchloride is added to the mixture. The resulting mixture is refluxed for 3 hours. After cooling, 400 ml. of water is added to the reaction mixture with stirring. The organic layer is separated and the aqueous phase is extracted with ether. The ethereal layer is combined with the organic layer, dried over sodium sulfate and evaporated under reduced pressure. The oily residue is crystallized on treatment with isopropyl alcohol to give 15.7 g. of 1-(2′-diethyl-aminoethyl)-3-(o-fluorophenyl) - 5 - chloro-indole-2-carboxamide, M.P. 120.5°–123.5° C. Recrystallization from isopropylalcohol gives 15.4 g. of the product, M.P. 123°–124.5° C. The analytical sample is obtained by further recrystallization from the same solvent, M.P. 126°–128° C.

*Analysis.*—Calculated for $C_{21}H_{23}ON_3ClF$ (percent): N, 10.83. Found (percent): N, 10.63.

IR $\nu_{max.}^{Paraffin}$: 1668 cm$^{-1}$.

Step B

To a suspension of 4.42 g. of lithium aluminium hydride in 230 ml. of dry ether is added 15 g. of 1-(2′-diethylaminoethyl) - 3 - (o-fluorophenyl) - 5 - chloro-indole-2-carboxamide with stirring. The mixture is stirred under reflux for 4 hours. After cooling, 40 ml. of water is added dropwise with stirring under cooling. The ethereal layer is separated by decantation, dried over sodium sulfate and evaporated to yield 13.4 g. of 2-aminomethyl-5-chloro - 1 - (2′-diethylaminoethyl)-3-(o-fluorophenyl-indole as an oil.

This oily product is dissolved in ethanol and treated with ethanolic hydrogen chloride under cooling. The precipitate is collected by filtration, washed with cold ethanol and dried to give the 2 - aminomethyl-5-chloro-1-(2′-diethylaminoethyl) - 3 - (o-fluorophenyl)-indole dihydrochloride, M.P. 243°–244° C. (decomp.). Recrystallization from ethanol affords an analytical sample, M.P. 250°–253° C.

*Analysis.*—Calculated for $C_{21}H_{25}N_3ClF \cdot 2HCl$ (percent): C, 56.44; H, 6.09; N, 9.40. Found (percent): C, 56.08; H, 6.04; N, 9.14.

Step C

To a solution of 8.5 g. of 2-aminomethyl-5-chloro-1-(2′-diethylaminoethyl) - 3 - (o-fluorophenyl)-indole dihydrochloride in 80 ml. of glacial acetic acid is added dropwise a solution of 9 g. of chromic anhydride in 7 ml. of water under cooling with stirring. The mixture is stirred at room temperature for 16 hours. The reaction mixture is added to a mixture of 200 ml. of 28% ammonia water, 160 ml. of water and 150 ml. of methylene chloride at 10°–20° C. under cooling with stirring. The organic layer is separated and aqueous phase is extracted with methylene chloride. The organic layers are combined and extracted with 150 ml. of 10% hydrochloric acid, basified with ammonia water, extracted with chloroform, and dried over sodium sulfate and the solvent is removed. The oily residue is dissolved in 100 ml. of ethyl acetate, treated with 6 g. of silica gel and filtered. The filtrate is treated with ethanolic hydrogen chloride and the solvent is removed. The residue is recrystallized from isopropyl alcohol to give 3.9 g. of 7-chloro-1-(2′-diethyl-aminoethyl) - 5 - (o-fluorophenyl) - 1,3 - dihydro-2H-1,4-benzodiazepine - 2 - one dihydrochloride, M.P. 214°–214.5° C. (decomp.).

Preparation of the starting material 5-chloro-3-(o-fluorophenyl)-indole - 2 - carboxamide used as a starting material in this example does not belong to this invention, but will be disclosed hereunder in order to complete the present disclosure.

To a solution of 150 ml. of ethyl acetoacetate in 400 ml. of dry benzene, is added 33 g. of calcium oxide in small portions. The mixture is heated under reflux condition for several hours. After cooling, a deposited solid is collected by filtration, washed with benzene and dried to give ethyl calcioacetoacetate, M.P. 220–221° C.

A mixture of 87 g. of o-fluorobenzyl bromide, 137 g. of ethyl calcioacetoacetate and 300 ml. of dimethylform-amide is heated at 75° C. for 6 hours. After completion of the reaction, the solvent is removed by distillation under reduced pressure, and 150 ml. of ethanolic hydrogen chloride is added to the residue. The mixture is stirred at room temperature to decompose the unreacted salt. The solvent is removed by distillation under reduced pressure, and 200 ml. of water is added to the residue. The separated yellow oily product is extracted with ether, and the organic layer is washed with water, dried over sodium sulfate and concentrated, and the residue is distilled under reduced pressure to give 99.4 g. (90.8%) of ethyl o-fluorobenzyl acetoacetate, B.P. 164–167° C./23 mm. Hg. Infrared absorption spectrum, $\nu_{max}^{Paraffin}$: 1740, 1720, 1590, 1496 cm.$^{-1}$

*Analysis.*—Calculated for $C_{13}H_{15}FO_3$ (percent): C, 65.55; H, 6.30. Found (percent): C, 65.40; H, 6.04.

To an ice-cold solution of 99.4 g. of ethyl o-fluorobenzylacetoacetate in 420 ml. of ethanol is added dropwise 150 ml. of 50% aqueous potassium hydroxide solution on cooling, and then 80 ml. of ice-water is added to the mixture. To this mixture is added dropwise, diazonium salt solution prepared from 53.3 g. of p-chloroaniline, 180 ml. of conc. hydrochloric acid, 28.8 g. of sodium nitrite and 275 ml. of water, below 5° C. After addition, the reaction mixture is stirred below 5° C. The separated oily product solidifies gradually, and the solid substance is collected by filtration, washed with water and dried to give 128.4 g. (92.2%) of ethyl α-(o-fluorobenzyl)-α-(p-chlorophenyl-azo)-acetoacetate, M.P. 55°–60° C. Recrystallization from ethanol is repeated for an analytical sample, M.P. 79°–80° C. Infrared absorption spectrum, $\nu_{max}^{Paraffin}$: 1750, 1715, 1600, 1580, 1495 cm.$^{-1}$

*Analysis.*—Calculated for $C_{19}H_{18}ClFN_2O_3$ (percent): C, 61.54; H, 4.86; N, 7.5; Cl, 9.58. Found (percent): C, 61.20; H, 4.53; N, 7.3; Cl, 9.56.

To a solution of 100 ml. of conc. sulfuric acid in 900 ml. of isopropanol is added 526.5 g. of ethyl α-(o-fluorophenyl)-α-(p-chlorophenylazo) acetoacetate and then the mixture is heated under refluxing condition for 4 hours with stirring. The reaction mixture is cooled and the precipitate is collected by filtration, washed with water and dried to give 336 g. of ethyl 5-chloro-3-(o-fluorophenyl)-indole-2-carboxylate, M.P. 180°–186° C. The analytical sample is recrystallized from ethanol, M.P. 188°–189° C. Infrared absorption spectrum, $\nu_{max}^{Paraffin}$: 3300, 1690, 1550, 1492 cm.$^{-1}$

*Analysis.*—Calculated for $C_{17}H_{13}ClFNO_2$ (percent): C, 64.25; H, 4.09; N, 4.41; Cl, 11.18. Found (percent): C, 64.28; H, 3.92; N, 4.04; Cl, 11.32.

To a solution of 19 g. of potassium hydroxide in 350 ml. of methanol is added 45.9 g. of ethyl 5-chloro-3-(o-fluorophenyl)-indole carboxylate and the mixture is refluxed for 5 hours. The solvent is removed under reduced pressure and the residue is dissolved in 400 ml. of water. The solution is treated with charcoal, and made acidic with conc. hydrochloric acid to give 40.1 g. of 5-chloro-3-(o-fluorophenyl)-indole-2-carboxylic acid, M.P. 250°–252° C. (decomp.). The analytical sample is recrystallized from benzene, M.P. 254°–245° C. (decomp.) Infrared absorption spectrum $\nu_{max}^{Paraffin}$: 3440, 2700–2300 (broad), 1680, 1555, 1490 cm.$^{-1}$ A mixture of 14.5 g. of 5-chloro-3-(o-fluorophenyl)-indole-2-carboxylic acid and 24 g. of thionyl chloride is refluxed for 2 hours. After completion of the reaction, excess thionyl chloride is removed by distillation under reduced pressure. To the residue is added 200 ml. of dry toluene and gaseous ammonia is introduced to the mixture under ice-cooling with stirring. The precipitate is collected by filtration, washed thoroughly with water and dried to give 14 g. (97.2%) of 5-chloro-3-(o-fluorophenyl)-indole-2-carboxamide, M.P. 213°–216° C. The analytical sample is recrystallized from tetrahydrofuran-benzene, M.P. 227°–228° C. Infrared absorption spectrum, $\nu_{max}^{Paraffin}$: 3460, 3300, 3200, 1659, 1592, 1490 cm.$^{-1}$

*Analysis.*—Calculated for $C_{15}H_{10}ClFN_2O$ (percent): N, 9.71; Cl, 12.31. Found (percent): N, 9.84; Cl, 12.23.

EXAMPLE 2

Ozonized oxygen is passed into a solution of 50 g. of 2-aminomethyl-5-chloro - 1 - (2'-diethylaminoethyl)-3-(o-fluorophenyl)-indole dihydrochloride in 1000 ml. of formic acid at 10° C. for 6 hours. To the reaction mixture is added 750 ml. of ether and 500 g. of crushed ice. The mixture is neutralized with 1500 g. of 28% ammonia water. The organic layer is separated and the aqueous phase is extracted with ether. The organic layers are combined and dried over sodium sulfate and the solvent is removed. The residue is dissolved in ethanol and treated with ethanolic hydrogen chloride. The mixture is concentrated to dryness under reduced pressure. The residue is crystallized from iso-propyl alcohol to give 5-(o-fluorophenyl)-7-chloro-1-(2' - diethylaminoethyl)-1,3-dihydro-2H-1,4-benzodiazepine-2-one dihydrochloride, M.P. 217° C. (decomp.). The infrared spectrum of this material is identical with that of the product obtained in Example 1.

EXAMPLE 3

The procedure of Example 2 is repeated employing acetic acid in place of the formic acid to give 7-chloro-5-(o-fluorophenyl) - 1 - (2'-diethylaminoethyl)-1,3-dihydro-2H-1,4-benzodiazepine-2-one dihydrochloride, M.P. 216°–218° C.

EXAMPLE 4

Step A

According to the procedure of Example 1, Step A, but replacing β-N,N-diethylaminoethyl chloride by γ-N,N-dimethylaminopropyl chloride, there is obtained 5-chloro-3-(o-fluorophenyl) - 1 - (3'-dimethylaminopropyl)-indole-2-carboxamide as an oil.

Step B

According to the procedure of Example 1, Step B, but replacing 5-chloro-1-(2' - diethylaminoethyl)-3-(o-fluorophenyl)-indole-2-carboxamide by 5-chloro-1-(3'-dimethylaminopropyl) - 3-(o-fluorophenyl)-indole-2-carboxamide, there is obtained 2-aminomethyl-5-chloro-1-(3'-dimethylaminopropyl)-3-(o-fluorophenyl)-indole as an oil.

Step C

According to the procedure of Example 2, but replacing 2-aminomethyl - 5 - chloro-1-(2'-diethylaminoethyl)-3-(o-fluorophenyl)-indole dihydrochloride by 2-aminomethyl-5-chloro - 1 - (3'-dimethylaminopropyl)-3-(o-fluorophenyl)-indole, there is obtained 7-chloro-1-(3'-dimethylaminopropyl) - 5 - (o-fluorophenyl)-7-chloro-1,3-dihydro-2H-1,4-benzodiazepine-2-one dihydrochloride, M.P. 191°–198° C. (decomp.).

EXAMPLE 5

Step A

A mixture of 3.5 g. of 5-chloro-3-(o-fluorophenyl)-indole-2-carbonitrile, 40 ml. of dimethylformamide, 0.75 g. of sodium hydride and 50 ml. of toluene is stirred at room temperature for 1 hour and then at 50° C. for 1 hour. After cooling, 2.1 g. of β-N,N-diethylaminoethyl chloride is added to the mixture and heated under reflux for 13 hours. The reaction mixture is cooled and poured into 200 ml. of ice-water. The organic layer is separated and the aqueous plase is extracted with ether. The extracts are combined with the organic layer and dried over sodium sulfate. The solvent is removed under reduced pressure. The orange yellow oily residue is dissolved in ethyl acetate and chromatographed on silica gel to give 4.4 g. of 5-chloro-1-[2' - diethylaminoethyl]-3-(o-fluorophenyl)- indole-2-carbonitrile, as a yellow oil, which is homogenous in the thin layer chromatography.

IR $\nu_{max.}^{Paraffin}$: 2220, 1580, 1540, 1492 cm.$^{-1}$

Step B

A solution of 4.4 g. of 5-chloro-1-[2'-diethylaminoethyl]-3-[o - fluorophenyl - indole-2-carbonitrile in 30 ml. of dry ether is added dropwise to a suspension of 2 g. of lithium aluminium hydride in 300 ml. of dry ether with stirring. The mixture is heated under reflux for 4 hours, cooled, and thereto is added 30 ml. of water. The ethereal layer is separated, dried over sodium sulfate and evaporated under reduced pressure to give 4.1 g. of 2-aminomethyl-5-chloro-[2'-diethylaminoethyl] - 3 - [o-fluorophenyl]-indole as a yellow oil. Treatment of the base with excess alcoholic hydrogen chloride gives the dihydrochloride which is recrystallized from ethanol to give the pure product having M.P. 235.5°–236°.

Step C

According to the procedure in Example 2 there is obtained 7-chloro - 5 - (o - fluorophenyl)-1-(2'-diethylaminoethyl)-1,3 - dihydro - 2H - 1,4-benzodiazepine-2-one dihydrochloride.

Preparation of the starting material

The 5-chloro - 3 - (o-fluorophenyl) - indole-2-carbonitrile used as a starting material in this example is not part of this invention but its preparation is disclosed hereunder in order that the present disclosure may be complete.

A mixture of 20.7 g. of 3-(o-fluorophenyl)-5-chloro-indole-2-carboxamide and 107 g. of phosphorous oxychloride is heated under refluxing condition for 20 min. After cooling, the resulting precipitate is collected by filtration, washed with water and dried to give 18.7 g. of 5-chloro - 3 - (o-fluorophenyl)-indole-2-carbonitrile, M.P. 185°–186° C. Yield: 98.7%. Recrystallization from benzene raises the melting point to 187°–188° C. Infrared absorption spectrum, $\nu_{max.}^{Paraffin}$: 3300, 2220, 1546, 1492 cm.$^{-1}$

*Elementary analysis.*—Calculated for $C_{15}H_8ClFN_2$ (percent): C, 66.54; H, 2.96; N, 10.35. Found (percent): C, 66.80; H, 2.80; N, 10.51.

EXAMPLE 6

Using the procedure described in Example 5, but replacing β-N,N-diethylaminoethyl chloride employed in Step A by γ-diethylaminopropyl chloride, there is obtained 7-chloro-1-(3' - diethylaminopropyl)-5-(o-fluorophenyl)-1,3-dihydro-2H - 1,4 - benzodiazepine-2-one dihydrochloride, M.P. 188°–191° C. (decomp.).

Similarly, using the procedure described in Example 5, replacing β-N,N-diethylaminoethyl chloride employed in Step A by γ-N-methylaminopropyl chloride, β-dimethylamino-α-methyl-ethyl chloride, and β-(4'-methylpiperazino)-ethyl chloride, there are obtained 7-chloro-5-(o-fluorophenyl) - 1 - (3'-methylaminopropyl)-1,3-dihydro-2H-1,4-benzodiazepine-2-one dihydrochloride, 7-chloro-1-(2'-dimethylamino - 1' - methyl-ethyl)-5-(o-fluorophenyl)-1,3-dihydro-2H - 1,4-benzodiazepine-2-one dihydrochloride and 7-chloro-5-(o-fluorophenyl)-1-[2''-(4''-methylpiperazino) - ethyl]-1,3-dihydro-2H-1,4-benzodiazepine 2-one trihydrochloride, respectively.

EXAMPLE 7

Using the procedure described in Example 5, but replacing β-N,N-diethylaminoethyl chloride employed in Step A by γ-(4'-methylpiperazino)-propyl chloride and replacing ethanolic hydrogen chloride empolyed in Step C by a solution of maleic acid in methanol, there is obtained 7-chloro-5 - (o-fluorophenyl)-1-[3' - (4'''-methylpiperazino)propyl]-1,3-dihydro - 2H1,4-benzodiazepine-2-one dimaleate.

Similarly, using the procedure, but replacing β-N,N-diethylamino chloride employed in Step A by γ-[4'-(2'-ethoxy-ethyl)-piperazino]propyl chloride and replacing ethanolic hydrogen chloride employed in Step C by a solution of maleic acid in methanol, there is obtained 7-chloro-5-(o - fluorophenyl)-1-[3' - (4''-12''' - ethoxyethyl]-piperazino)propyl] - 1,3-dihydro - 2H-1,4-benzodiazepine-2-one trimaleate.

EXAMPLE 8

Following the procedure of Example 1, but substituting 5-chloro-3-phenyl-indole-2-carboxamide for 5-chloro-(o-fluorophenyl)indole-2-carboxamide, there is prepared 7-chloro-1-(2'-ethylaminoethyl) - 5-phenyl-1,3-dihydro-2l-1,4-benzodiazepine-2-one, M.P. 79°–81° C.

The 5-chloro-3-phenyl-indole-2-carboxamide as a starting material in this example is obtained as follows:

A mixture of 131 g. of p-chloroaniline, 255 ml. of conc. hydrochloric acid and 250 ml. of water is heated, and then cooled below 0° C. To the mixture is added dropwise 222 g. of a 32.3% aqueous solution of sodium nitrite at a temperature below 10° C. with stirring, and then 115 g. of sodium acetate. The resultant mixture is added portionwise to a chilled mixture of 220 g. of ethyl α-benzylacetoacetate, 1000 ml. of methanol and 200 g. of anhydrous potassium acetate at a temperature below 10° C. with stirring.

After addition, the reaction mixture is stirred for 2 hours at a temperature below 10° C. The precipitate is collected by filtration, washed with water thoroughly, washed with methanol and dried to give 343 g. ethyl α-benzyl-α-(p-chloro-phenyl-azo) acetoacetate. Recrystallization from ethanol gave pure product having a melting point of 61°–62.5° C.

To a suspension of 180 g. of ethyl α-benzyl-α-(p-chlorophenyl-azo) acetoacetate in 500 ml. of isopropanol, is added dropwise 50 ml. of concentrated sulfuric acid. The mixture is heated under refluxing for 2.5 hours, and then cooled. The precipitate is collected by filtration, washed with isopropanol, and enough water, and dried to yield 114 g. of ethyl 5-chloro-3-phenyl-indole-2-carboxylate. Recrystallization from ethanol gives pure product having M.P. 172°–172.5° C.

*Analysis.*—Calculated for $C_{17}H_{15}O_2NCl$ (percent): C, 67.89; N, 4.66; Cl, 11.79. Found (percent): C, 68.10; N, 4.67; Cl, 11.71.

A mixture of 82 g. of ethyl 5-chloro-3-phenyl-indole-2-carboxylate and 1.2 l. of a 2.7% potassium hydroxide ethanol solution is heated under refluxing for 2 hours. The ethanol is removed by distillation and the residue is dissolved in 300 ml. of water. The solution is made acidic with conc. hydrochloric acid under cooling. The precipitate formed is collected by filtration, washed thoroughly with water and dried to give 72 g. of 5-chloro-3-phenyl-indole-2-carboxylic acid having melting point of 227°–228° C.

Recrystallization from benzene raises the melting point to 231° C.

A mixture solution of 60 g. of 3-phenyl-5-chloro-indole-2-carboxylic acid, 1.2 l. of anhydrous benzene and 150 g. of thionyl chloride is heated and refluxed for 3 hours. After completion of the reaction, the solvent is removed by distillation under reduced pressure to give almost quantitatively 64.2 g. of 3-phenyl-5-chloro-indole-2-carboxylic acid chloride.

Gaseous ammonia is passed into a solution of 64.2 g. of 3-phenyl-5-chloro-indole-2-carboxylic acid chloride in 1.5 l. of dry ether under ice-cooling, and the mixture is allowed to stand for 1 hr. The reaction mixture is concentrated. The precipitates are collected by filtration, washed with water and dried to give 58 g. of 3-phenyl-5-chloroindole-2-carboxamide, M.P. 217°–219° C.

A mixture of 9.0 g. of 3-phenyl-5-chloro-indole-2-carboxamide and 44.5 g. of phosphorous oxychloride is heated under reflux for 15 minutes. The ice-cold reaction mixture is filtered, washed with ice-water and dried to give 7 g. of 5-chloro-3-phenyl-indole-2-carbonitrile, M.P. 212°–214° C. The filtrate is poured into ice-water and the resulting precipitate is collected by filtration, washed with water and dried to give 1.1 g. of additional 5-chloro-3-phenyl - indole-2-carbonitrile, M.P. 200°–200.5° C.

EXAMPLE 9

Using the procedure described in Example 5, but replacing 5-chloro-3-(o-fluorophenyl)-indole-2-carbonitrile and β-N,N-diethylaminoethyl chloride employed in Step A by 5-chloro-3-phenyl-indole-2-carbonitrile and β-N,N-dimethylaminoethyl chloride, there is obtained 7-chloro-1-(2'-dimethylaminoethyl)-5-phenyl - 1,3-dihydro - 2H-1,4-benzodiazepine-2-one.

Similarly, using the procedure in Example 5, but replacing 5 - chloro - 3 - (o - fluorophenyl) - indole-2-carbonitrile and β-N,N-diethylaminoethyl chloride employed in Step A by 5-chloro-3-phenyl-indole-2-carbonitrile and γ-N,N-dimethylaminopropyl chloride, there is obtained 7-chloro - 1 - (3' - dimethylaminopropyl)-5-phenyl-1,3-dihydro-2H-1,4-benzodiazepine-2-one.

Similarly, using the procedure in Example 5, but replacing 5 - chloro-3-(o-fluorophenyl)-indole-2-carbonitrile and β-N,N-diethylaminoethyl chloride employed in Step A by 5-chloro-3-phenyl-indole-2-carbonitrile and β-N,N-dimethylamino-α-methyl-ethyl chloride, there is obtained 7-chloro - 1 - (2'-dimethylamino-1'-methyl-ethyl)-5-phenyl-1,3-dihydro-2H-1,4-benzodiazepine-2-one.

EXAMPLE 10

Using the procedure described in Example 5, but replacing 5 - chloro-3-(o-fluorophenyl)-indole-2-carbonitrile and β-N,N-diethylaminoethyl chloride employed in Step A by 5-chloro-3-phenyl-indole-2-carbonitrile and β-pyrrolidinoethyl chloride, and replacing ethanolic hydrogen chloride employed in Step C by a solution of maleic acid in methanol, there is obtained 7-chloro-5-phenyl-1-(2'-pyrrolidinoethyl) - 1,3 - dihydro-2H-1,4-benzodiazepine-2-one maleate.

Similarly, using the procedure described in Example 5, but replacing 5 - chloro - 3 - (o - fluorophenyl) - indole-2-carbonitrile, and β-N,N-diethylaminoethyl chloride employed in Step A by 5-chloro-3-phenyl-indole-2-carbonitrile and β-piperidinoethyl chloride, and replacing ethanolic hydrogen chloride employed in Step C by a solution of maleic acid in ethanol, there is obtained 7-chloro-5-phenyl-1 - (2' - piperidinoethyl)-1,3-dihydro-2H-1,4-benzodiazepine-2-one maleate.

Similarly, using the procedure described in Example 5, but replacing 5 - chloro - 3-(o-fluorophenyl)-indole-2-carbonitrile and β-N,N-diethylaminoethyl chloride employed in Step A by 5-chloro-3-phenyl-indole-2-carbonitrile and β-morpholinoethyl chloride, and replacing ethanolic hydrogen chloride employed in Step C by a solution of maleic acid in ethanol, there is obtained 7-chloro-1-(2'-morpholinoethyl) - 5-phenyl-1,3-dihydro-2H-1,4-benzodiazepine-2-one maleate.

EXAMPLE 11

To a suspension of 10 g. of 1-(2'-diethylaminoethyl)-3-(o-fluorophenyl)-5-chloro-indole-2-carboxamide and 20 ml. of toluene is added 7.9 g. of phosphorous oxychloride. The mixture is heated under reflux for 3 hours with stirring. After cooling, the reaction mixture is poured into 20 ml. of ice-water. The resulting precipitate is collected by filtration, washed with water and dried to give 10 g. of a solid, M.P. 155°–170° C. Recrystallization from isopropyl-alcohol gives colorless prisms having M.P. 183°–190° C. This product (1.5 g.) is treated with methanolic ammonia to give 1.3 g. of 5-chloro-1-(2'-dimethylaminoethyl)-3-(o-fluorophenyl)-indole-2-carbonitrile as an oil.

This material is identified by comparison of its infrared spectrum with the spectrum of the product obtained in Example 5 Step A. On reduction as in Example 5, Step B and oxidation as in Example 3, there is obtained 7-chloro - 1 - (2' - diethylaminoethyl)-5-(o-fluorophenyl)-1,3-dihydro-2H-1,4-benzodiazepine-2-one dihydrochloride.

EXAMPLE 12

To a mixture of 2.8 g. of sodium hydride, 20 ml. of dimethylformamide and 20 ml. of toluene is added 13.7 g. of 5-chloro-3-(o-chlorophenyl)-indole-2-carbonitrile. An exothermic reaction ensued and the mixture is stirred at 50°–60° C. for 30 minutes. To the resulting mixture is added 13.6 g. of β-N,N-diethylaminoethyl chloride and the mixture is refluxed for 15 hours. After cooling, the mixture is poured into 300 ml. of water and extracted with benzene. The combined extracts are dried and the solvent is removed under reduced pressure to give 21.3 g. of 5 - chloro-3-(o-chlorophenyl)-1-(2'-diethylaminoethyl)-indole-2-carbonitrile as an oil. This oily product is dissolved in 30 ml. of dry ether and the solution is added dropwise to a suspension of 7.2 g. of lithium aluminium hydride in 100 ml. of dry ether below 5° C. The mixture is refluxed for 5 hours. After cooling, 40 ml. of water is added dropwise to the mixture under ice-cooling. The mixture is stirred at room temperature for 1 hour and then at 30° C. for 1 hour. The organic layer is separated by decantation and the residue is washed with ether. The washings are combined with the organic layer and dried, and the solvent is removed to give 20.4 g. of 2-aminomethyl - 5-chloro-3-(o-chlorophenyl)-1-(2'-diethylaminoethyl)-indole as an oil. This oily product is dissolved in 20 ml. of ethanol and treated with ethanolic hydrogen chloride (14 g. of hydrogen chloride in 30 ml. of ethanol) to give 21.1 g. of the dihydrochloride of 2-aminomethyl-5-chloro - 3 - (o-chlorophenyl) - 1-(2'-diethylaminoethyl)-indole. Recrystallization from aqueous ethanol gives 19.1 g. of the product, M.P. 235°–235.5° C. (decomp.).

*Analysis.*—Calculated for $C_{21}H_{25}N_3Cl_2 \cdot 2HCl$ (percent): Cl, 30.61. Found (percent): Cl, 30.43.

This 2 - aminomethyl-5-chloro-3-(o-chlorophenyl)-(2'-diethylaminoethyl) indole dihydrochloride is oxidized by using ozonized oxygen in acetic acid in the manner described in Example 2 hereinabove, to give 5-chloro-1-(2'-diethylaminoethyl) - 5 - (o-chlorophenyl)-1,3-dihydro-2H-1,4-benzodiazepine-2-one, M.P. 68°–70° C.

The 5 - chloro-3-(o-chlorophenyl)-indole-2-carbonitrile used as a starting material in this example is not a part of this invention, but its preparation is disclosed hereunder in order that the present disclosure may be complete. To a mixture of 97.5 g. of ethyl acetoacetate, 17.3 g. of metallic sodium and 370 ml. of absolute ethanol is added dropwise 133 g. of o-chlorobenzyl chloride under refluxing condition. Stirring is continued under refluxing condition for an additional 10 hours. The reaction mixture is cooled and filtered. The filtrate is concentrated and distilled under reduced pressure to give 138 g. of ethyl α-(o-chlorobenzyl) acetoacetate, B.P. 130°–140° C./0.35 mm. Hg.

A mixture of 25.6 g. of p-chloroaniline, 64 ml. of conc. hydrochloric acid and 90 ml. of water is heated to a solution and then cooled at 0° C. To the mixture is added dropwise a solution of 13.9 g. of sodium nitrate in 29.1 ml. of water below 5° C., with stirring. After addition, 23.4 g. of sodium acetate is added to the mixture.

The resulting mixture is added dropwise to a chilled mixture of 50.9 g. of α-(o-chloro-benzyl) acetoacetate, 200 ml. of methanol and 39.2 g. of anhydrous potassium acetate below 0° C. The reaction mixture is stirred for 3 hours below 5° C., and extracted with ether. The ethereal layer is dried over sodium sulfate and concentrated under reduced pressure to an oily substance, which is dissolved in 240 ml. of ethanol and dry aqueous hydrogen chloride is passed through the solution for 20 min. The mixture is stirred at 50°–60° C. for 2 hours and then cooled to 0° C. After allowing to stand overnight at 0° C., the precipitates are collected by filtration, washed with cold ethanol and then water, and dried to yield 40 g. of ethyl 5 - chloro-3-(o-chlorophenyl)-indole-2-carboxylate, M.P. 195°–196° C. The analytical sample is recrystallized from ethanol, M.P. 196°–196.5° C. Infrared absorption spectrum, $\nu_{max.}^{Paraffin}$: 3290, 1680 cm.$^{-1}$

*Analysis.*—Calculated for $C_{17}H_{13}O_2NCl_2$ (percent): C, 61.14; H, 3.92; N, 4.19. Found (percent): C, 61.14; H, 3.98; N, 4.00.

To a solution of 13.2 g. of potassium hydroxide in 300 ml. of ethanol is added 33.4 g. of ethyl 5-chloro-3-(o-chlorophenyl)-indole-2-carboxylate and the mixture is refluxed for 2 hours.

The solvent is removed under reduced pressure and the residue is dissolved in 350 ml. of water. The solution is cooled to 0° C. and made acidic (pH<1) with 19 ml. of conc. hydrochloric acid under cooling.

The mixture is stirred at 0° C. for 1 hour and the precipitate which formed is collected by filtration, washed thoroughly with water, and dried to give 27.6 g. (90.3%) of 5-chloro-3-(o-chlorophenyl)-indole-2-carboxylic acid, 212°–213.5° C. (decomp.). The analytical sample is recrystallized from benzene-ethanol, M.P. 215.5°–216° C. (decomp.). Infrared absorption spectrum, $\nu_{max.}^{Paraffin}$: 3415, 2550, 1676 cm.$^{-1}$

*Analysis.*—Calculated for $C_{15}H_9O_2NCl_2$ (percent): Cl, 23.16. Found (percent): Cl, 23.02.

A mixture of 27.6 g. of 5-chloro-3-(o-chlorophenyl)-indole-2-carboxylic acid and 32.2 g. of thionyl chloride is heated under refluxing condition for 2 hours. After the reaction is completed, excess of thionyl chloride is removed under reduced pressure. To the residue is added 150 ml. of water, and gaseous ammonia is passed through to the mixture for 15 min. under cooling with stirring. The reaction mixture is stirred at room temperature for 1 hour. The precipitate which formed is collected by filtration, washed thoroughly with water and dried to give 27.7 g. of 5-chloro-3-(o-chlorophenyl)-indole-2-carboxamide. Recrystallization from ethanol gives 21 g. of the product having M.P. 210°–212° C. Infrared absorption spectrum, $\nu_{max.}^{Paraffin}$: 3460, 3290 (shoulder), 3200, 1650, 1590 cm.$^{-1}$

*Analysis.*—Calculated for $C_{15}H_{10}Cl_2N_2O$ (percent): C, 59.04; H, 3.30. Found (percent): C, 60.15; H, 3.26.

A mixture of 15.3 g. of 5-chloro-3-(o-chlorophenyl)-indole-2-carboxamide and 76.8 of phosphorus oxychloride is stirred at 90° C. for 20 min. After cooling, the reaction mixture is poured into 500 ml. of ice-water. The precipitate is collected by filtration, washed thoroughly with water and dried to give 13.7 g. (95.8%) of 5-chloro-3-(o-chlorophenyl)-indole-2-carbonitrile, M.P. 166.5°–167.5° C. Infrared absorption spectrum, $\nu_{max.}^{Paraffin}$: 3315, 2230 cm.$^{-1}$

*Analysis.*—Calculated for $C_{15}H_8N_2Cl_2$ (percent): C, 62.74; H, 2.81; N, 9.76; Cl, 24.69. Found (percent): C, 62.92; H, 2.63; N, 9.55; Cl, 24.52.

EXAMPLE 13

Using the procedure described in Example 5, but replacing 5-chloro-3-(o-fluorophenyl)-indole-2-carbonitrile and β-N,N-diethylaminoethyl chloride employed in Step A by 5-nitro-3-phenyl-indole-2-carbonitrile and β-N,N-dimethylaminoethyl chloride and replacing lithium aluminium hydride and dry ether employed in Step B by sodium borohydride and boron trifluoride etherate, and dry tetrahydrofuran, there is obtained 1-(2'-dimethylaminoethyl)-7 - nitro - 5 - phenyl - 1,3 - dihydro - 2H - 1,4 - benzodiazepine-2-one dihydrochloride, M.P. 232°–233° C. (decomp.).

Similarly, using the procedure described in Example 4, but replacing 5 - chloro-3-(o-fluorophenyl)-indole-2-carbonitrile, and β-N,N-diethylaminoethyl chloride employed in Step A by 5-nitro-3-phenyl-indole-2-carbonitrile and γ-N,N-dimethylaminopropyl chloride and replacing lithium aluminium hydride and dry ether employed in Step B by sodium borohydride and boron trifluoride, and dry tetrahydrofuran, there is obtained 1-(3'-dimethylaminoethyl) - 7 - nitro - 5 - phenyl - 1,3 - dihydro - 2H - 1,4-benzodiazepine-2-one hydrochloride, M.P. 191°–192° C. (decomp.).

The 5-nitro-3-phenyl-indole-2-carbonitrile as starting material in this example is obtained as follows:

A mixture of 25 g. of phenylpyruvic acid, 23 g. of p-nitrophenylhydrazine, 480 ml. of acetic acid and 450 ml. of conc. hydrochloric acid is heated for 2 hours. The reaction mixture is cooled and then poured into ice-water. The precipitate is collected by filtration, washed with water and dried to give 40 g. of 5-nitro-3-phenyl-indole-2-carboxylic acid. A sample is recrystallized from ethanol to give crystals, M.P. 299° C. (decomp.).

*Analysis.*—Calcd. for $C_{15}H_{10}O_4N_2$ (percent): C, 63.83; H, 3.57; N, 9.92. Found (percent): C, 63.40; H, 3.51; N, 10.02.

A mixture of 27.5 g. of 5-nitro-3-phenyl-indole-2-carboxlic acid and 115 g. of thionyl chloride is heated under reflux for 30 min. The excess of thionyl chloride is removed under reduced pressure and the residue is dissolved in 400 ml. of anhydrous tetrahydrofuran. Gaseous ammonia is introduced into the solution under ice-cooling. The precipitate is collected by filtration, washed with water and then ethanol, and dried to give 14.5 g. of 5-nitro-3-phenyl-indole-2-carboxamide, M.P. 299°–302° C.

The tetrahydrofuran layer is concentrated to dryness under reduced pressure and the residue is washed with water, ethanol and ether successively, and dried to give an additional 12.1 g. of 5-nitro-3-phenyl-indole-2-carboxamide, M.P. 295.5°–297° C. Recrystallization from methanol affords the analytical sample, M.P. 302° C.

*Analysis.*—Calcd. for $C_{15}H_{11}O_3N_3$ (percent): C, 64.05; H, 3.94; N, 14.94. Found (percent): C, 64.13; H, 3.89; N, 14.15.

A mixture of 13.5 g. of 5-nitro-3-phenyl-indole-2-carboxamide and 59 g. of phosphorous oxychloride is heated under reflux for 30 min. The reaction mixture is poured over crushed ice with stirring. The precipitate is collected by filtration, washed with water and dried to give 11 g. of 5-nitro-3-phenyl-indole-2-carbonitrile, M.P. 261° C. Recrystallization from methanol gives pale yellow needles, M.P. 263°–264° C.

*Analysis.*—Calculated for $C_{15}H_9O_2N_3$ (percent): C, 68.44; H, 3.45; N, 15.95. Found (percent): C, 68.61; H, 3.07; N, 16.19.

EXAMPLE 14

Using the procedure described in Example 1, but replacing 7-chloro-3-(o-fluorophenyl)-indole-2-carboxamide employed in Step A by 5-methyl-3-phenyl-indole-2-carboxamide, there is obtained 1-(2'-diethylaminoethyl)-7-methyl-5-phenyl-1,3-dihydro-2H-1,4-benzodiazepine-2-one and the dihydrochloride thereof.

Similarly, using the procedures described in Examples 1 to 3, but replacing 7-chloro-3-(o-fluorophenyl)-indole-2-carboxamide employed in Example 1, Step A, by 5-methoxy-3-phenyl-indole-2-carboxamide, 5 - bromo - 3-phenyl-indole-2-carboxamide, and 5 - trifluoromethyl - 3-phenyl-indole-2-carboxamide, there are obtained 1-(2'-diethylaminoethyl)-7-methoxy-5-phenyl-1,3-dihydro-2H-1,4-benzodiazepine-2-one,
7-bromo-1(2'-diethylaminoethyl)-5-phenyl-1,3-dihydro-2H-1,4-benzodiazepine-2-one and
1-(2'-diethylaminoethyl)-5-phenyl-7-trifluoroethyl-1,3,-dihydro-2H-1,4-benzodiazepine-2-one respectively, and the hydrochloride thereof.

What is claimed is:

1. A process for preparing 1-substituted benzodiazepines represented by the formula,

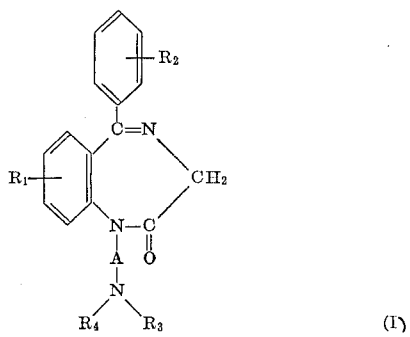

wherein A signifies a straight chain or branched alkylene group having 1–5 carbon atoms; $R_1$ signifies a hydrogen atom, a halogen atom, a nitro group, a lower alkyl group, a lower alkoxy group, or a trifluoromethyl group; $R_2$ signifies a hydrogen atom, a halogen atom, a nitro group, a lower alkyl group, a lower alkoxy group, or a trifluoromethyl group; $R_3$ signifies a hydrogen atom or a lower alkyl group; and $R_4$ signifies a lower alkyl group, provided that $R_3$ and $R_4$ may form an unsubstituted- or lower hydroxyalkyl-, alkoxyalkyl- or alkenyloxyalkyl-substituted pyrrolidino group, an unsubstituted- or lower hydroxyalkyl-, alkoxyalkyl- or alkenyloxyalkyl-substituted morpholino group, or an unsubstituted- or lower hydroxyalkyl-, alkoxyalkyl or alkenyloxyalkyl-substituted piperidino group together with the adjacent nitrogen atom, and acid addition salts thereof which process comprises contacting a 1-substituted aminomethylindole represented by the formula,

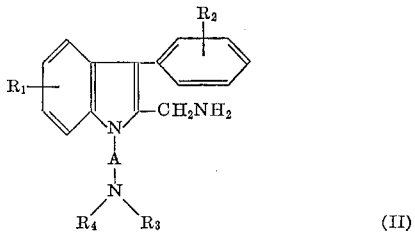

wherein A, $R_1$, $R_2$, $R_3$ and $R_4$ are as defined above, or an acid addition salt thereof with at least the stoichiometric amount of an oxidizing agent selected from the group consisting of ozone, hydrogen peroxide, performic acid, peracetic acid, perbenzoic acid, chromic acid, potassium permanganate and manganese dioxide in the presence of a solvent.

2. A process according to claim 1, wherein the solvent is water, acetone, carbon tetrachloride, acetic acid or sulfuric acid.

3. A process according to claim 1, wherein the acid of the acid addition salt of the benzodiazepine (I) is hydrochloric acid, sulfuric acid, nitric acid, phosphoric acid, chromic acid, maleic acid, fumaric acid, succinic acid, formic acid or acetic acid.

4. A process according to claim 1, wherein the acid of the acid addition salt of the 1-substituted aminomethylindole (II) is hydrochloric acid, hydrobromic acid, sulfuric acid, phosphoric acid, methanesulfonic acid, ethanedisulfonic acid, β-hydroxyethanesulfonic acid, acetic acid, lactic acid, oxalic acid, succinic acid, fumaric acid, maleic acid, malic acid, tartaric acid, citric acid, benzoic acid, salicyclic acid, phenylacetic acid, mandelic aid and picric acid.

5. A process according to claim 1, wherein the oxidizing agent is chromic acid or ozone and the reaction is carried out at a room temperature.

6. A process for preparing 1-substituted benzodiazepines represented by the formula,

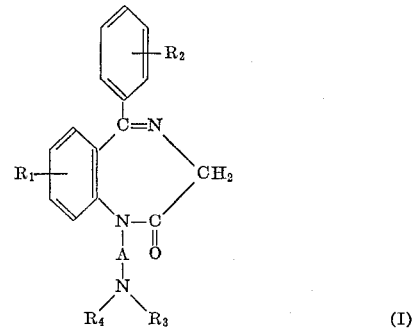

wherein A signifies a straight chain or branched alkylene group having 1–5 carbon atoms; $R_1$ signifies a hydrogen atom, a halogen atom, a nitro group, a lower alkyl group, a lower alkoxy group, or a trifluoromethyl group; $R_2$ signifies a hydrogen atom, a halogen atom, a nitro group, a lower alkyl group, a trifluoromethyl group, or a lower alkoxy group; $R_3$ signifies a hydrogen atom or a lower alkyl group; and $R_4$ signifies a lower alkyl group, provided that $R_3$ and $R_4$ may form an unsubstituted- or lower hydroxyalkyl-, alkoxyalkyl- or alkenyloxyalkyl-substituted pyrrolidino group, an unsubstituted- or lower hydroxyalkyl-, alkoxyalkyl- or alkenyloxyalkyl-substituted morpholino group, or an unsubstituted- or lower hydroxyalkyl-, alkoxyalkyl- or alkenyloxyalkyl-substituted piperidino group together with the adjacent nitrogen atom, and acid addition salts thereof which process comprises contacting a 1-substituted indole-2-carbonitrile represented by the formula,

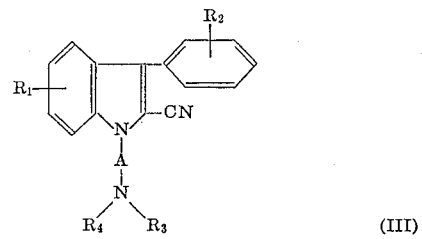

wherein A, $R_1$, $R_2$, $R_3$ and $R_4$ are as defined above, or an acid addition salt thereof with a reducing agent capable of converting a nitrile group to an aminomethyl group and then contacting the resulting 1-substituted2-aminomethylindole represent by the formula,

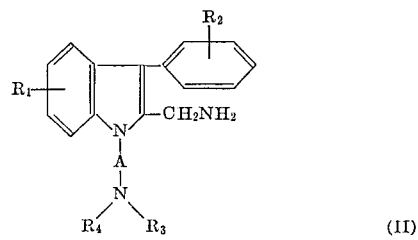

wherein A, $R_1$, $R_2$, $R_3$ and $R_4$ are as defined above, or an acid addition salt thereof with at least the stoichiometric amount of an oxidizing agent selected from the group consisting of ozone, hydrogen peroxide, performic acid, peracetic acid, perbenzoic acid, chromic acid, potassium permanganate and manganese dioxide, in the presence of a solvent.

7. A process according to claim 6, wherein the reducing agent is nascent hydrogen obtained by electrolytic reduction, alkali-metal in alcohols, hydrogen in the presence of palladium-, nickel- or platinum-system catalyst, chromous acetate-alkali or metal hydride complex.

8. A process according to claim 6, wherein the acid of the acid addition salt of the 1-substituted indole-2-carbonitrile (III) is hydrochloric acid, hydrobromic acid, sulfuric acid, phosphoric acid, methanesulfonic acid, ethanesulfonic acid, β-hydroxyethane-sulfonic acid, acetic acid, lactic acid, oxalic acid, succinic acid, fumaric acid, maleic acid, malic acid, tartaric acid, citric acid, benzoic acid, salicylic acid, phenylacetic acid, mandelic acid and picric acid.

9. A process for preparing 1-substituted benzodiazepines represented by the formula,

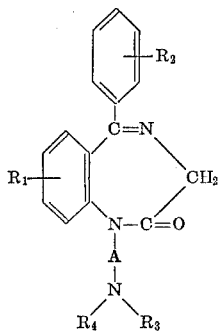

wherein A signifies a straight chain or branched alkylene group having 1–5 carbon atoms; $R_1$ signifies a hydrogen atom, a halogen atom, a nitro group, a lower alkyl group, a lower alkoxy group, or a trifluoromethyl group; $R_2$ signifies a hydrogen atom, a halogen atom, a nitro group, a lower alkyl group, a lower alkoxy group, or a trifluoromethyl group; $R_3$ signifies a hydrogen atom or a lower alkyl group; and $R_4$ signifies a lower alkyl group, provided that $R_3$ and $R_4$ may form an unsubstituted- or lower-hydroxyalkyl-, alkoxyalkyl- or alkenyloxyalkyl-substituted pyrrolidino group, an unsubstituted or lower hydroxyalkyl-, alkoxyalkyl- or alkenyloxyalkyl-substituted morpholino group, or an unsubstituted or lower hydroxyalkyl-, alkoxyalkyl- or alkenylxyalkyl-substituted piperidino group together with the adjacent nitrogen atom, and acid addition salts thereof which process comprises contacting a 1-substituted-indole-2-carboxamide represented by the formula,

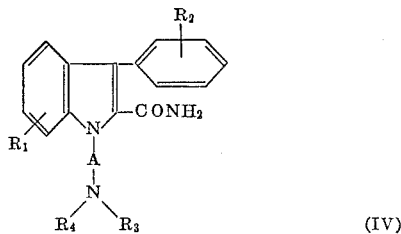

wherein A, $R_1$, $R_2$, $R_3$ and $R_4$ are as defined above, with a reducing agent capable of converting a carboxamide group to an aminomethyl group and then contacting the resulting 1-substituted 2-aminomethylindole represented by the formula,

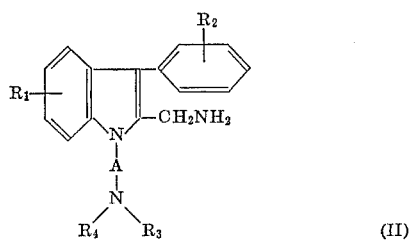

wherein A, $R_1$, $R_2$, $R_3$ and $R_4$ are as defined above, or an acid addition salt thereof with at least the stoichiometric amount of an oxidizing agent selected from the group consisting of ozone, hydrogen peroxide, performic acid, peracetic acid, perbenzoic acid, chromic acid, potassium permanganate and manganese dioxide in the presence of a solvent.

10. A process according to claim 9, wherein the acid of the acid addition salt of the 1-substituted indole-2-carboxamide (IV) is hydrochloric acid, hydrobromic acid, sulfuric acid, phosphoric acid, methanesulfonic acid, ethanedisulfonic acid, β-hydroxyethanesulfonic acid, acetic acid, latic acid, oxalic acid, succinic acid, fumaric acid, maleic acid, malic acid, tartaric acid, citric acid, benzoic acid, salicylic acid, phenylacetic acid, mandelic acid and picric acid.

11. A process according to claim 9, wherein the reducing agent is nascent hydrogen obtained by electrolytic reduction, alkali-metal in alcohols, hydrogen in the presence of palladium-, nickel- or platinum-system catalyst, chromous acetate-alkali or metal hydride complex.

12. A process for preparing 1-substituted benzodiazepines represented by the formula,

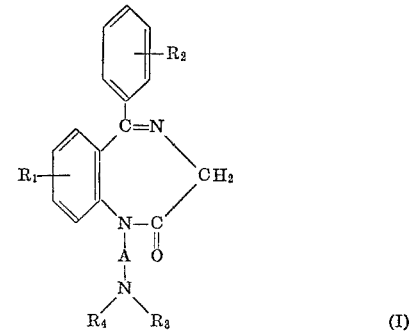

(I)

wherein A signifies a straight chain or branched alkylene group having 1–5 carbon atoms; $R_1$ signifies a hydrogen atom, a halogen atom, a nitro group, a lower alkyl group, a lower alkoxy group, a trifluoromethyl group; $R_2$ signifies a hydrogen atom, a halogen atom, a nitro group, a lower alkyl group, a lower alkoxy group, or a trifluoromethyl group; $R_3$ signifies a hydrogen atom or a lower alkyl group; and $R_4$ signifies a lower alkyl group, provided that $R_3$ and $R_4$ may form an unsubstituted- or lower hydroxyalkyl alkoxyalkyl- or alkenyloxyalkyl-substituted pyrrolidino group, an unsubstituted- or lower hydroxyalkyl, alkoxyalkyl- or alkenyloxyalkenyl-substituted morpholino group, or an unsubstituted- or alkoxyalkyl- or alkenyloxyalkyl-substituted piperidino group together with the adjacent nitrogen atom, and acid addition salts thereof which process comprises contacting an indole-2-carbonitrile of the formula,

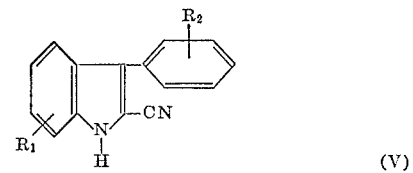

(V)

wherein $R_1$ and $R_2$ are as defined above, with at least about one mole of a condensing agent selected from the group consisting of alkali metal, alkaline earth metal, alkali metal hydride, alkaline earth metal hydride, alkali metal hydroxide, alkaline earth metal hydroxide, alkali metal amide, alkaline earth metal amide, alkali metal alkoxide, alkaline earth metal alkoxide, alkylalkali metal and arylalkali metal per mole of said indole-2-carbonitrile to form a metal salt of the indole-2-carbonitrile (V), contacting the resulting metal salt of the indole-2-carbonitrile (V) with a halide or sulfonate ester of an aminoalcohol of the formula,

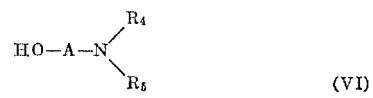

(VI)

in the presence of a solvent, contacting the resulting 1-substituted indole-2-carbonitrile represented by the formula

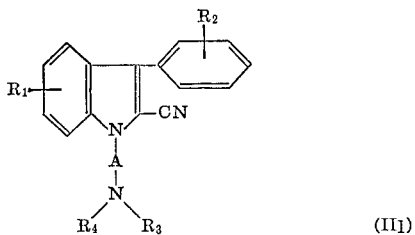

(III)

wherein A, $R_1$, $R_2$, $R_3$ and $R_4$ are as defined above, or an acid addition salt thereof with a reducing agent capable of converting a nitrile group to an aminomethyl group and then contacting the resulting 1-substituted 2-aminomethylindole represented by the formula,

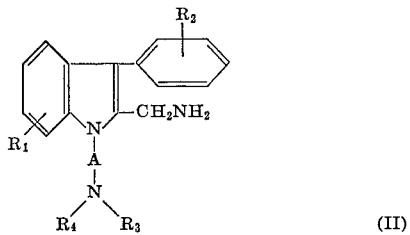

(II)

wherein A, $R_1$, $R_2$, $R_3$ and $R_4$ are as defined above, or an acid addition salt thereof with at least the stoichiometric amount of an oxidizing agent selected from the group consisting of ozone, hydrogen peroxide, performic acid, perbenzoic acid, chromic acid, potassium permanganate and manganese dioxide in the presence of a solvent.

13. A process for preparing 1-substituted benzodiazepines represented by the formula,

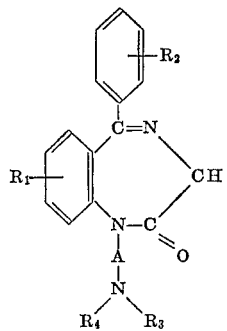

wherein A signifies a straight chain or branched alkylene group having 1–5 carbon atoms; $R_1$ signifies a hydrogen atom, a halogen atom, a nitro group, a lower alkyl group, a lower alkoxy group, a trifluoromethyl group; $R_2$ signifies a hydrogen atom, a halogen atom, a nitro group, a lower alkyl group, a lower alkoxy group, or a trifluoromethyl group; $R_3$ signifies a hydrogen atom or a lower alkyl group and $R_4$ signifies a lower alkyl group, provided that $R_3$ and $R_4$ may form an unsubstituted- or lower-hydroxyalkyl, alkoxyalkyl- or alkenyloxyalkyl-substituted pyrrolidino group, an unsubstituted- or lower hydroxyalkyl, alkoxyalkyl- or alkenyloxy-alkyl-substituted morpholino group, an unsubstituted- or lower hydroxyalkyl, alkoxyalkyl- or alkenyloxyalkyl-substituted piperidino group together with the adjacent nitrogen atom, and acid addition salts thereof which process comprises contacting an indole-2-carboxamide represented by the formula,

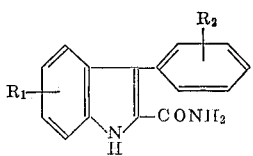

(VII)

wherein $R_1$ and $R_2$ are as defined above, with at least about one mole of a condensing agent selected from the group consisting of alkali metal, alkaline earth metal, alkali metal hydride, alkaline earth metal hydride, alkali metal hydroxide, alkaline earth metal hydroxide, alkali metal amide, alkaline earth metal amide, alkali metal alkoxide, alkaline earth metal alkoxide, alkylalkali metal and arylalkali metal per mole of said indole-2-carboxamide to form a metal salt of the indole-2-carbonitrile (V), contacting the resulting metal salt of the indole-2-carbonitrile (V) with a halide or sulfonate ester of an aminoalcohol of the formula:

(VI)

in the presence of a solvent, contacting the resulting 1-substituted indole-2-carboxamide represented by the formula,

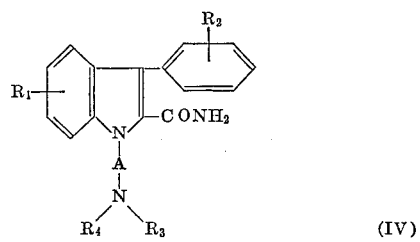

(IV)

wherein A, $R_1$, $R_2$, $R_3$ and $R_4$ are as defined above, or an acid addition salt thereof with a reducing agent capable of converting a carboxamide group to an aminomethyl group and then contacting the resulting 1-substituted 2-aminomethylindole represented by the formula,

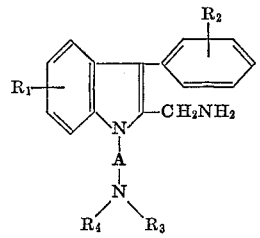

wherein A, $R_1$, $R_2$, $R_3$ and $R_4$ are as defined above, or an acid addition salt thereof at least the stoichiometric amount of an oxidizing agent selected from the group consisting of ozone, hydrogen peroxide, performic acid, peracetic acid, perbenzoic acid, chromic acid, potassium permanganate and manganese dioxide in the presence of a solvent.

14. A process for preparing 1-substituted benzodiazepines, represented by the formula,

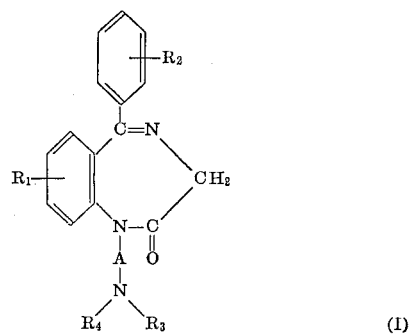

(I)

wherein A signifies a straight chain or branched alkylene group having 1–5 carbon atoms; $R_1$ signifies a hydrogen atom, a halogen atom, a nitro group, a lower alkyl group, a lower alkoxy group, or a trifluoromethyl group; $R_2$ signifies a hydrogen atom, a halogen atom, a nitro group, a lower alkyl group, a lower alkoxy group, or a trifluoromethyl group; $R_3$ signifies a hydrogen atom or a lower alkyl group; and $R_4$ signifies a lower alkyl group, provided that $R_3$ and $R_4$ may form an unsubstituted- or lower hydroxyalkyl-, alkoxyalkyl- or lower alkenyloxyalkyl-substituted pyrrolidino group, an unsubstituted- or lower hydroxyalkyl-, alkoxyalkyl- or lower alkenyloxyalkyl-substituted morpholino group, or an unsubstituted- or lower hydroxyalkyl-, alkoxyalkyl- or lower alkenyloxyalkyl-substituted piperidino group together with the adjacent nitrogen atom, and acid addition salts thereof which process comprises contacting an indole-2-carboxamide represented by the formula,

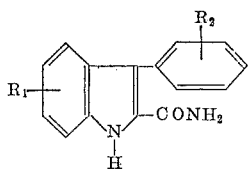

(VII)

wherein $R_1$ and $R_2$ are as defined above, with at least about one mole of a condensing agent selected from the group consisting of alkali metal, alkaline earth metal, alkali metal hydride, alkaline earth metal hydride, alkali metal hydroxide, alkaline earth metal hydroxide, alkali metal amide, alkaline earth metal amide, alkali metal alkoxide, alkaline earth metal alkoxide, alkylalkali metal and arylalkali metal per mole of said indole-2-carboxamide to form a metal salt of the indole-2-carbonitrile (V), contacting the resulting metal salt of the indole-2-carbonitrile (V) with a halide or sulfonate ester of an aminoalcohol of the formula.

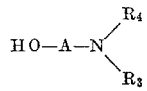

(VI)

in the presence of a solvent, contacting the resulting 1-substituted indole-2-carboxamide represented by the formula,

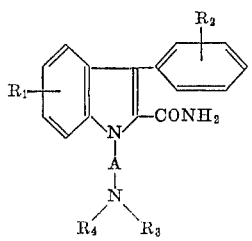

(IV)

wherein A, $R_1$, $R_2$, $R_3$ and $R_4$ are as defined above, or an acid addition salt thereof with a dehydrating agent selected from the group consisting of phosphorus oxychloride, phosphorus trichloride, phosphorus pentachloride, p-toluenesulfonylchloride, methylsulfonylchloride, acetyl chloride, thionyl chloride, benzoyl chloride and carbobenzoxychloride in the presence or absence of an inert solvent, contacting the resulting 1-substituted indole-2-carbonitrile represented by the formula,

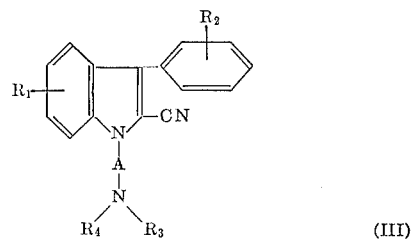

(III)

wherein A, $R_1$, $R_2$, $R_3$, $R_4$ and $R_5$ are as defined above, or an acid addition salt thereof with a reducing agent capable of converting a carboxamide group to a nitrile and then contacting the resulting 1-substituted 2-amino-methylindole represented by the formula,

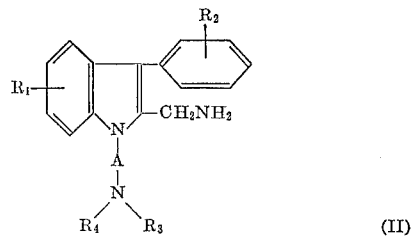

(II)

wherein A, $R_1$, $R_2$, $R_3$ and $R_4$ are as defined above, or an acid addition salt thereof with at least the stoichiometric amount of an oxidizing agent selected from the group consisting of ozone, hydrogen peroxide, performic acid, peracetic acid, perbenzoic acid, chromic acid, potassium permanganate and manganese dioxide in the presence of a solvent.

15. A process according to claim 14, wherein the reducing agent is nascent hydrogen obtained by electrolytic reduction, alkali-metal in alcohols, hydrogen in the presence of palladium-, nickel- or platinium-system catalyst, chromous acetate-alkali or metal hydride complex.

16. A process according to claim 14, wherein the acid of the acid addition salt of the indole-2-carbonitrile (IV) is hydrochloric acid, hydrobromic acid, sulfuric acid, phosphoric acid, methanesulfonic acid, ethanedisulfonic acid, β-hydroxyethanesulfonic acid, acetic acid, lactic acid, oxalic acid, succinic acid, fumaric acid, maleic acid, malic acid, tartaric acid, citric acid, benzoic aid, salicyclic acid, phenylacetic acid, mandelic acid and picric acid.

References Cited

Elderfield, "Heterocyclic Compounds," vol. 3, pp. 8-13 (Wiley) (1952).

Noller, "Chemistry of Organic Compounds," 2nd ed., pp. 250 and 254 (Saunders) (1957).

"Chemical Abstracts," vol. 52 (1958) Cols. 11039-40. Abstracting Nogradi "Monatsh Chem.," vol. 88, pp. 1087-94 (1958).

HENRY R. JILES, Primary Examiner

R. T. BOND, Assistant Examiner

U.S. Cl. X.R.

260—999, 326.13 R, 326.15, 326.14 R, 326.81, 268 BC, 268 R, 294 D, 294 A, 293 D, 247.2 A, 247.2 B, 247.5 B, 247.7 A, 569, 141

Disclaimer 3,632,805.—*Hisao Yamamoto*, Nishinomiya-shi, *Shigeho Inaba*, Takarazuka-shi, *Toshiyuki Hirohashi*, Kobe, *Kikuo Ishizumi* and *Isamu Maruyama*, Minoo-shi, and *Kazuo Mori*, Kobe, Japan, PROCESS FOR PRODUCING 1-AMINOALKYLBENZODIAZEPINE DERIVATIVES. Patent dated Jan. 4, 1972. Disclaimer filed Jan. 16, 1975, by the assignee, *Sumitomo Chemical Company, Ltd.*

Hereby enters this disclaimer to all of the claims of said patent.

[*Official Gazette April 8, 1975.*]